United States Patent [19]
Gerhard et al.

[11] Patent Number: 6,140,979
[45] Date of Patent: Oct. 31, 2000

[54] SCANNED DISPLAY WITH PINCH, TIMING, AND DISTORTION CORRECTION

[75] Inventors: Gregory J. Gerhard; Clarence T. Tegreene, both of Seattle; Bashir Z. Eslam, Redmond, all of Wash.

[73] Assignee: Microvision, Inc., Bothell, Wash.

[21] Appl. No.: 09/129,252

[22] Filed: Aug. 5, 1998

[51] Int. Cl.[7] .................................................. G09G 5/00
[52] U.S. Cl. .................................. 345/7; 345/8; 348/51; 348/52; 348/54; 348/55; 359/217; 359/206; 359/236; 359/234; 359/337; 359/462; 359/466; 359/630
[58] Field of Search ........................... 345/7, 8; 359/217, 359/206, 236, 234, 337, 462, 466, 630; 348/54, 55, 51, 52

[56] References Cited

U.S. PATENT DOCUMENTS

| | | | |
|---|---|---|---|
| 4,793,687 | 12/1988 | Shenker et al. | 35/365 |
| 5,121,138 | 6/1992 | Schermer et al. | |
| 5,127,061 | 6/1992 | Amir et al. | 382/1 |
| 5,162,828 | 11/1992 | Furness et al. | |
| 5,164,848 | 11/1992 | Firth et al. | |
| 5,225,923 | 7/1993 | Montagu | 359/199 |
| 5,243,450 | 9/1993 | Gerbe et al. | 359/13 |
| 5,355,181 | 10/1994 | Ashizake et al. | |
| 5,420,414 | 5/1995 | Wentworth | |
| 5,467,104 | 11/1995 | Furness, III et al. | |
| 5,526,183 | 6/1996 | Chen | |
| 5,543,968 | 8/1996 | Freeman et al. | |
| 5,557,444 | 9/1996 | Melville et al. | |
| 5,596,339 | 1/1997 | Furness, III et al. | |
| 5,629,790 | 5/1997 | Neukermans et al. | |
| 5,648,618 | 7/1997 | Neukermans et al. | |
| 5,659,327 | 8/1997 | Furness, III et al. | |
| 5,659,430 | 8/1997 | Togino | |
| 5,673,139 | 9/1997 | Johnson | |
| 5,687,034 | 11/1997 | Palmer | |
| 5,694,237 | 12/1997 | Melville | |
| 5,701,132 | 12/1997 | Kollin et al. | |
| 5,726,671 | 3/1998 | Ansley et al. | 345/8 |
| 5,742,419 | 4/1998 | Dickensheets | |
| 5,751,465 | 5/1998 | Melville et al. | |

FOREIGN PATENT DOCUMENTS 60-107017  6/1985  Japan.

OTHER PUBLICATIONS

Eye Control Technologies, Inc., Catalog, 1998, Corvallis, Oregon, USA.
Intermec Technologies Corporation, Website, 1998.
United Barcode Industries, Website, 1998.
Denso, Toyota Tsusho America, Inc., Website, 1998.
Welch Allyn, 2–D High Capacity Symbologies: A Brief introduction, ISIT.com, 1998.
Welch Allyn, Product Literature, 1997, Skaneateles Falls, New York, USA.
Welch Allyn, Website, 1998.
Texlon Corporation, Website, 1998.
Tohken, Website, 1998.
Symbol, PDF147: The New Symbol of Data Management, Website, 1998.
Symbol Technologies, Inc., Brochure, 1998, Holtsville, New York, USA.
Systems Resources Corporation, Barcodes, aitworld website, 1998.
Flying Magazine, Weather–Piercing Camera, p. 32, Sep. 1997, USA.

*Primary Examiner*—Richard A. Hjerpe
*Assistant Examiner*—Kevin M Nguyen

[57] ABSTRACT

A display apparatus includes an image source that scans about two axes. To offset motion about a first of the axes during sweeps about the second axis, the apparatus includes a structure to produce offsetting motion about the first axis at a scanning rate equal to the twice-scanning rate about the second axis. The offsetting scan can be a ramp or other motion. In one embodiment, the offsetting motion is a resonant sinusoid. The offsetting motion may be produced by an auxiliary scanner such as a mechanical scanner, a piezoelectric scanner, a MEMs scanner or other scanner. Because the offsetting motion is very small, the auxiliary scanner can function with a very small scan angle.

47 Claims, 16 Drawing Sheets

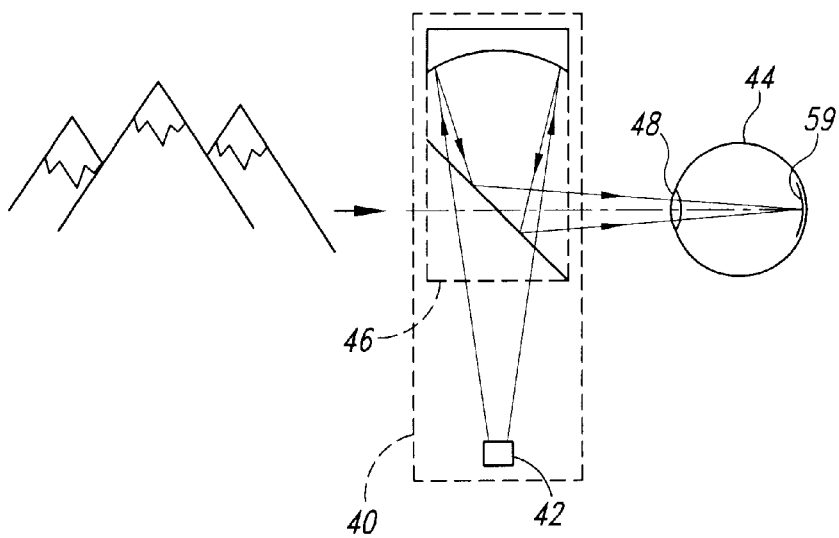
Fig. 1
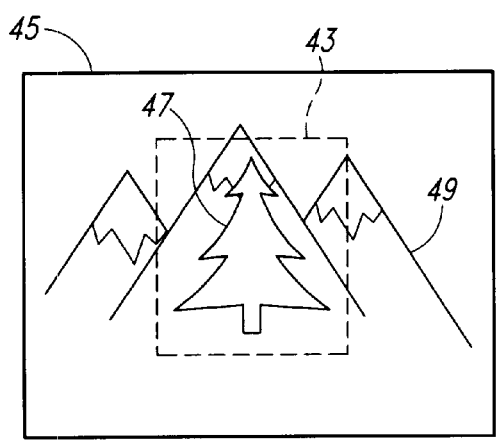 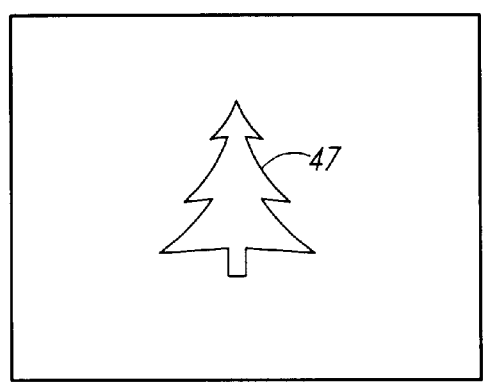
Fig. 2A  Fig. 2B

| $B_{0,0}$ | $B_{0,1}$ | $B_{0,2}$ | 0 | 0 | 0 | 0 | 0 | 0 | 0 | 0 |
|---|---|---|---|---|---|---|---|---|---|---|
| $B_{1,0}$ | $B_{1,1}$ | $B_{1,2}$ | $B_{0,3}$ | $B_{0,4}$ | $B_{0,5}$ | $B_{0,6}$ | $B_{0,7}$ | 0 | 0 | 0 |
| $B_{2,1}$ | $B_{2,3}$ | $B_{2,2}$ | $B_{1,3}$ | $B_{1,4}$ | $B_{1,5}$ | $B_{1,6}$ | $B_{1,7}$ | $B_{0,8}$ | $B_{0,9}$ | $B_{0,10}$ |

*Fig. 28*

SCANNED DISPLAY WITH PINCH, TIMING, AND DISTORTION CORRECTION

TECHNICAL FIELD

The present invention relates to scanned light devices and, more particularly, to scanned light beam displays and imaging devices that produce images for viewing or collecting images.

BACKGROUND OF THE INVENTION

A variety of techniques are available for providing visual displays of graphical or video images to a user. For example, cathode ray tube type displays (CRTs), such as televisions and computer monitors are very common. Such devices suffer from several limitations. For example, CRTs are bulky and consume substantial amounts of power, making them undesirable for portable or head-mounted applications.

Flat panel displays, such as liquid crystal displays and field emission displays, may be less bulky and consume less power. However, typical flat panel displays utilize screens that are several inches across. Such screens have limited use in head mounted applications or in applications where the display is intended to occupy only a small portion of a user's field of view.

One approach to overcoming many limitations of conventional displays is a scanned beam display, such as that described in U.S. Pat. No. 5,467,104 of Furness et al., entitled VIRTUAL RETINAL DISPLAY, which is incorporated herein by reference. As shown in FIG. 1, in a scanned beam display 40, a scanning source 42 outputs a scanned beam of light that is coupled to a viewer's eye 44 by a beam combiner 46. In scanned displays, a scanner, such as a scanning mirror or acousto-optic scanner, scans a modulated light beam onto a viewer's retina. An example of such a scanner is described in U.S. Pat. No. 5,557,444 to Melville et al., entitled MINIATURE OPTICAL SCANNER FOR A TWO-AXIS SCANNING SYSTEM, which is incorporated herein by reference. The scanned light enters the eye 44 through the viewer's pupil 48 and is imaged onto the retina 59 by the cornea. In response to the scanned light the viewer perceives an image.

Sometimes such displays are used for partial or augmented view applications. In such applications, a portion of the display is positioned in the user's field of view and presents an image that occupies a region 43 of the user's field of view 45, as shown in FIG. 2A. The user can thus see both a displayed virtual image 47 and background information 49. If the background light is occluded, the viewer perceives only the virtual image 47, as shown in FIG. 2B.

One difficulty with such displays is raster pinch, as will now be explained with reference to FIGS. 3–5. As shown diagrammatically in FIG. 3, the scanning source 42 includes an optical source 50 that emits a beam 52 of modulated light. In this embodiment, the optical source 50 is an optical fiber that is driven by one or more light emitters, such as laser diodes (not shown). The emitted beam 52 strikes a turning mirror 54 and is directed toward a horizontal scanner 56. The horizontal scanner 56 is a mechanically resonant scanner that scans the beam 52 periodically in a sinusoidal fashion. The horizontally scanned beam then travels to a vertical scanner 58 that scans periodically to sweep the horizontally scanned beam vertically. Eye coupling optics 60 then couple the scanned beam 52 to an exit pupil expander 62 that provides an expanded exit pupil for viewing by a viewer's eye 64. One such expander is described in U.S. Pat. No. 5,701,132 of Kollin, et al., entitled VIRTUAL RETINAL DISPLAY WITH EXPANDED EXIT PUPIL, which is incorporated herein by reference. One skilled in the art will recognize that, for differing applications, the exit pupil expander 62 may be omitted or may have a variety of structures, including diffractive or refractive designs. For example, the exit pupil expander 62 may be a planar or curved structure and may create any number or pattern of output beams in a variety of patterns.

Returning to the description of scanning, as the beam scans through each successive location in a plane 66, the beam color and intensity is modulated in a fashion to be described below to form a respective pixel of an image. By properly controlling the color and intensity of the beam for each pixel location, the display 40 can produce the desired image.

The respective waveforms of the vertical and horizontal scanners are shown in FIGS. 4A and B respectively. In the plane 66 (FIG. 3), the beam traces the pattern 68 shown in FIG. 5. As can be seen by comparing the actual scan pattern 68 to a desired raster scan pattern 69, the actual scanned beam 68 is "pinched" at the outer edges of the plane 66. That is, in successive forward and reverse sweeps of the beam, the pixels near the edge of the scan pattern are unevenly spaced. This uneven spacing can cause the pixels to overlap or can leave a gap between adjacent rows of pixels. Moreover, because image information is typically provided as an array of data, where each location in the array corresponds to a respective position in the ideal raster pattern 69, the displaced pixel locations can cause image distortion.

SUMMARY OF THE INVENTION

A display includes a primary scanning mechanism that simultaneously scans a beam of light both horizontally and vertically along substantially continuous scan paths. To reduce raster pinch or to correct for certain types of distortion, the display also includes an auxiliary or correction scanner or other variable beam-shifting device that correctively redirects the beam.

In one embodiment, the scanning mechanism scans in a generally raster pattern with a horizontal component and a vertical component. A mechanically resonant scanner produces the horizontal component by scanning the beam sinusoidally. A non-resonant or semi-resonant scanner scans the beam vertically along a generally linear scan path. Because the vertical scanner is moving during each sweep of the horizontal scanner, the vertical scanner imparts an initial vertical component to the horizontal scan path. To reduce raster pinch due to the vertical component, the auxiliary scanner adds a vertical component that offsets the initial vertical component.

In one embodiment the correction scanner operates at twice the frequency of the horizontal scanner. The angular swing of the correction scanner is selected to equal the angular travel of the vertical scanner during a horizontal sweep. For ease of fabrication, the correction scanner may be a resonant scanner having a resonant frequency at the desired correction scan rate. In such embodiments, the auxiliary component of the scan does not precisely match the raster pinch; however, the resonant auxiliary provides a substantial improvement without a complicated scanning pattern.

Where the auxiliary scan frequency is twice the horizontal scan frequency, the driving signal for the auxiliary scanner can be derived directly from the horizontal scanner or the driving signal of horizontal scanner. In one embodiment, a position detector outputs an electrical signal in response to a zero crossing or other repeated location in the horizontal scan pattern. The electrical signal is filtered and amplified to produce a driving signal for the auxiliary scanner that is twice the horizontal scan frequency.

In one embodiment, a displaced weight or other asymmetric feature is added to the scanner so that the scanner resonates along or around a different axis from the primary scan axis. Where the additional resonance is an integral multiple of the primary resonant frequency, the resulting scan pattern does not follow a straight line. For example, the resulting scan pattern can be a "bow tie" pattern where the off-axis movement offsets the motion of the vertical scan during horizontal sweeps.

BRIEF DESCRIPTION OF THE FIGURES

FIG. 1 is a diagrammatic representation of a display aligned to a viewer's eye.

FIG. 2A is a combined image perceived by a user resulting from the combination of light from an image source and light from a background.

FIG. 2B is an image perceived by a user from the display of FIG. 1 where the background light is occluded.

FIG. 28 is a representation of a data structure showing data predistorted to compensate for vertical optical distortion.

DETAILED DESCRIPTION OF THE INVENTION

Figure 6:
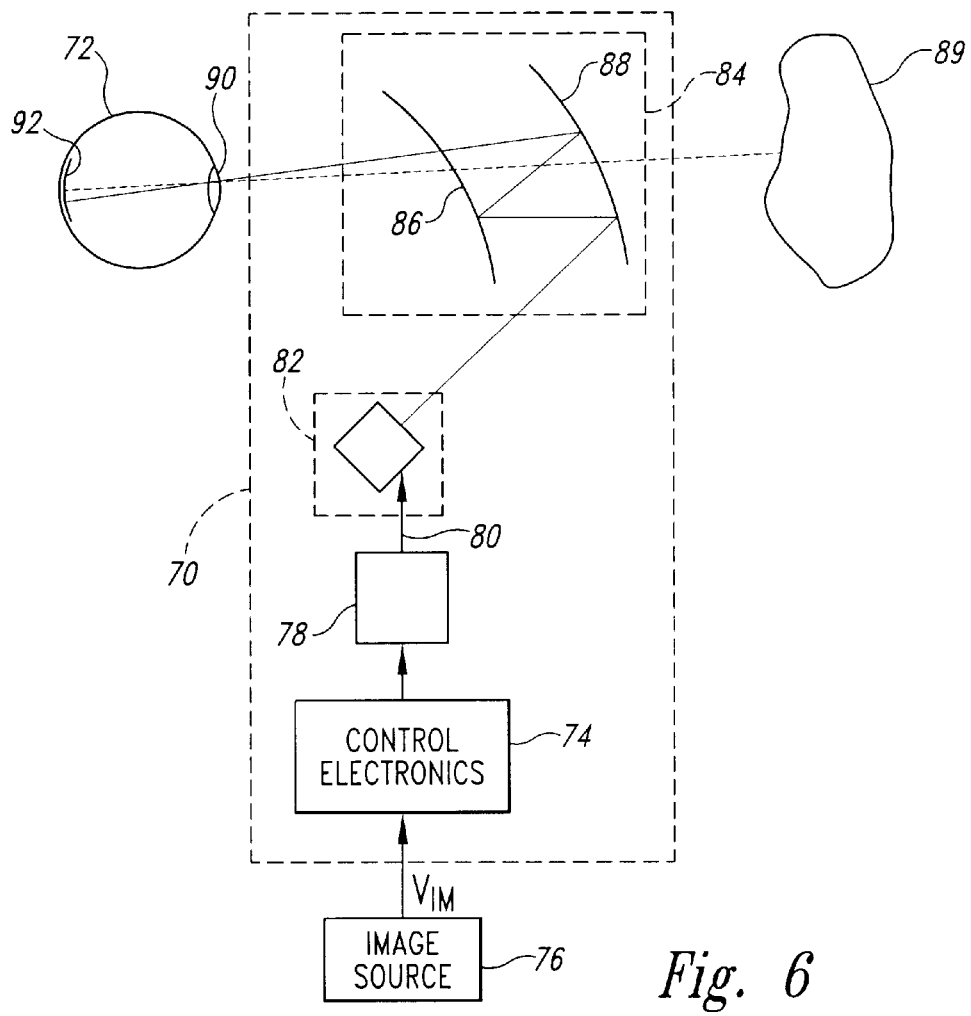
FIG. 6 is a diagrammatic representation of a display according to the one embodiment invention.

As shown in FIG. 6, a scanned beam display 70 according to one embodiment of the invention is positioned for viewing by a viewer's eye 72. The display 70 includes four principal portions, each of which will be described in greater detail below. First, control electronics 74 provide electrical signals that control operation of the display 70 in response to an image signal $V_{IM}$ from an image source 76, such as a computer, television receiver, videocassette player, or similar device.

The second portion of the display 70 is a light source 78 that outputs a modulated light beam 80 having a modulation corresponding to information in the image signal $V_{IM}$. The light source 78 may utilize coherent light emitters, such as laser diodes or microlasers, or may use non-coherent sources such as light emitting diodes. The light source 78 may be a directly modulated light emitter such as a light emitting diode (LED) or may be include a continuous light emitter indirectly modulated by an external modulator, such as an acousto-optic modulator.

The third portion of the display 70 is a scanning assembly 82 that scans the modulated beam 80 of the light source 78 through a two-dimensional scanning pattern, such as a raster pattern. The scanning assembly will be described in greater detail below with reference to FIGS. 8–12.

Imaging optics 84 form the fourth portion of the display 70. The imaging optics 84 in the embodiment of FIG. 6 include a pair of curved, partially transmissive mirrors 86 and 88 that shape and focus the scanned beam 80 appropriately for viewing by the eye 72. The scanned beam 80 enters the eye 72 through a pupil 90 and strikes the retina 92. When scanned modulated light strikes the retina 92, the viewer perceives the image. The mirrors 86, 88 combine the light from the scanning assembly 82 with light received from a background 89 to produce a combined input to the viewer's eye 72. Although the background 89 is presented herein as a "real-world" background, the background light may be occluded or may be produced by another light source of the same or different type.

Figure 7:
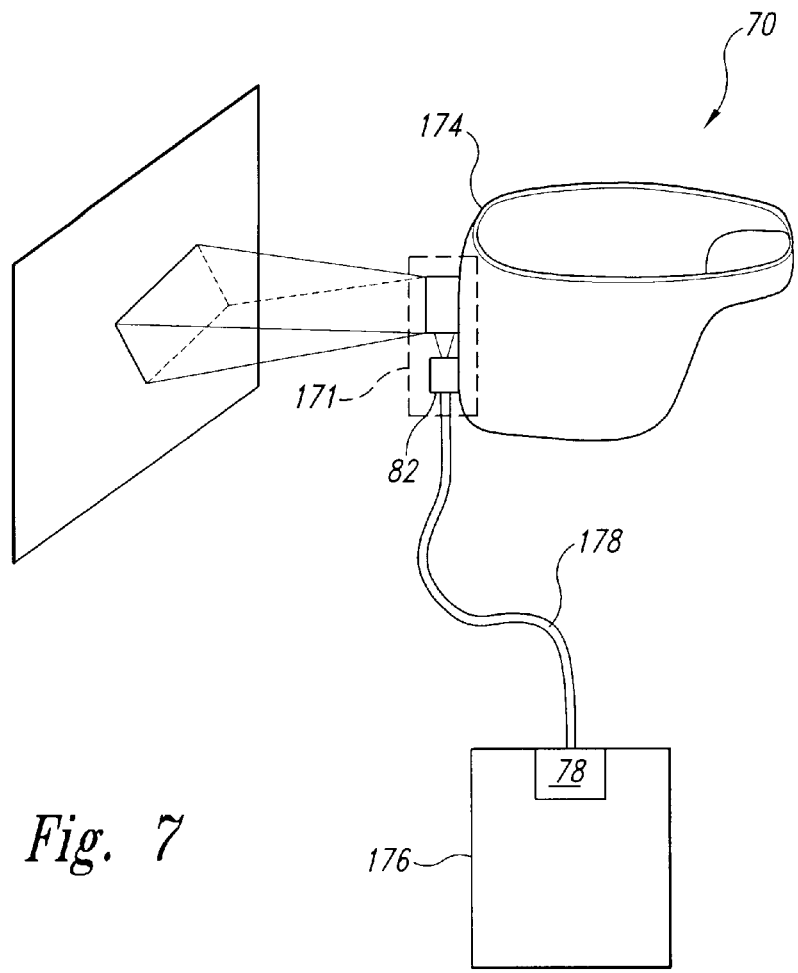
FIG. 7 is an isometric view of a head-mounted scanner including a tether.

Although the elements here are presented diagrammatically, one skilled in the art will recognize that the components are typically sized and configured for mounting to a helmet or similar frame as a head-mounted display 70, as shown in FIG. 7. In this embodiment, a first portion 171 of the display 70 is mounted to a head-borne frame 174 and a second portion 176 is carried separately, for example in a hip belt. The portions 174, 176 are linked by a fiber optic and electronic tether 178 that carries optical and electronic signals from the second portion to the first portion. An example of a fiber-coupled scanner display is found in U.S. Pat. No. 5,596,339 of Furness et al. al., entitled VIRTUAL RETINAL DISPLAY WITH FIBER OPTIC POINT SOURCE which is incorporated herein by reference.

Figure 3:
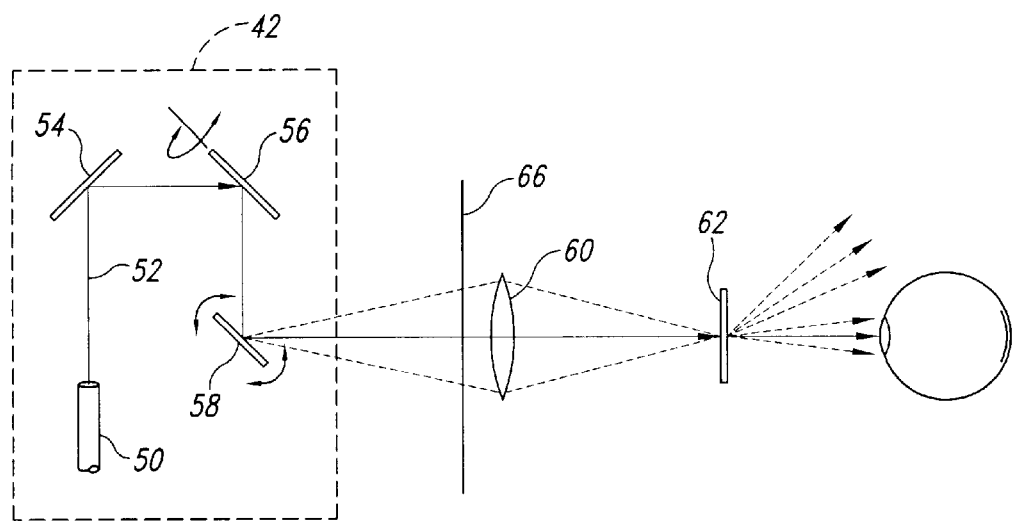
FIG. 3 is a diagrammatic representation of a scanner and a user's eye showing bidirectional scanning of a beam and coupling to the viewer's eye.

The scanning assembly 82 will be described next with reference to FIG. 8. The scanning assembly 82 includes several components that correspond to the scanning source 42 of FIG. 3, where components common to the scanning assembly 82 and scanning source 42 are numbered the same. However, unlike the scanning source 42, the scanning assembly 82 includes an active correction mirror 100 that can pivot to scan the light beam 80 along the vertical axis. As will be explained below, the correction mirror 100 produces a varying corrective shift along the vertical axis during each sweep (forward or reverse) of the horizontal scanner 56. The corrective shift offsets vertical movement of the beam 80 caused by the vertical scanner 58 to reduce the overall deviation of the scanning pattern from the desired pattern shown in broken lines in FIG. 5.

Before describing the effects of the correction mirror 100 and the relative timing of the various signals, exempting embodiments of mechanically resonant scanners 200, 220 suitable for use as the horizontal scanner 56 and vertical scanner 58 will be described with reference to FIG. 9.

The principal scanning component of the resonant scanner 200 is a moving mirror 202 mounted to a spring plate 204. The dimensions of the mirror 202 and spring plate 204 and the material properties of the spring plate 204 are selected so that the mirror 202 and spring plate 204 have a high Q with a natural oscillatory ("resonant") frequency on the order of 1–100 kHz, where the selected resonant frequency depends upon the application. For VGA quality output with a 60 Hz refresh rate and no interlacing, the resonant frequency is preferably about 15–20 kHz.

A ferromagnetic material mounted with the mirror 202 is driven by a pair of electromagnetic coils 206, 208 to provide motive force to mirror 202, thereby initiating and sustaining oscillation. The ferromagnetic material is preferably integral to the spring plate 204 and body of the mirror 202. Drive electronics 218 provide electrical signals to activate the coils 206, 208, as described above. Responsive to the electrical signals, the coils 206, 208 produce periodic electromagnetic fields that apply force to the ferromagnetic material, thereby causing oscillation of the mirror 202. If the frequency and phase of the electric signals are properly synchronized with the movement of the mirror 202, the mirror 202 oscillates at its resonant frequency with little power consumption.

The vertical scanner 220 is structured very similarly to the resonant scanner 200. Like the resonant scanner 201, the vertical scanner 220 includes a mirror 222 driven by a pair of coils 224, 226 in response to electrical signals from the drive electronics 218. However, because the rate of oscillation is much lower for vertical scanning, the vertical scanner 220 is typically not resonant. The mirror 222 receives light from the horizontal scanner 201 and produces vertical deflection at about 30–100 Hz. Advantageously, the lower frequency allows the mirror 222 to be significantly larger than the mirror 202, thereby reducing constraints on the positioning of the vertical scanner 220. The details of virtual retinal displays and mechanical resonant scanning are described in greater detail in U.S. Pat. No. 5,467,104, of Furness III, et al., entitled VIRTUAL RETINAL DISPLAY which is incorporated herein by reference.

One skilled in the art will recognize a variety of other structures that may scan a light beam through a generally raster pattern. For example, a bidirectional microelectromechanical (MEMs) scanner may provide the primary scanning. Such scanners are described in U.S. Pat. No. 5,629,790 to Neukermanns et al. entitled MICROMACHINED TORSIONAL SCANNER, which is incorporated herein by reference. Like the scanning system described above, the horizontal components of the MEMs scanners are typically defined by mechanical resonances of their respective structures as is described in greater detail below with reference to FIG. 16. Like the two scanner system described above with reference to FIG. 3, these biaxial scanners typically suffer similar raster pinch problems due to movement along the slower scan axis during sweeps along the faster scan axis.

The light source 78 outputs a beam of light that is modulated according to the image signal from the drive electronics 218. At the same time, the drive electronics 218 activate the coils 206, 208, 224, 226 to oscillate the mirrors 202, 222. The modulated beam of light strikes the oscillating horizontal mirror 202, and is deflected horizontally by an angle corresponding to the instantaneous angle of the mirror 202. The deflected light then strikes the vertical mirror 222 and is deflected at a vertical angle corresponding to the instantaneous angle of the vertical mirror 222. As will also be described below, the modulation of the optical beam is synchronized with the horizontal and vertical scans so that at each position of the mirrors, the beam color and intensity correspond to a desired virtual image. The beam therefore "draws" the virtual image directly upon the user's retina.

Figure 9:
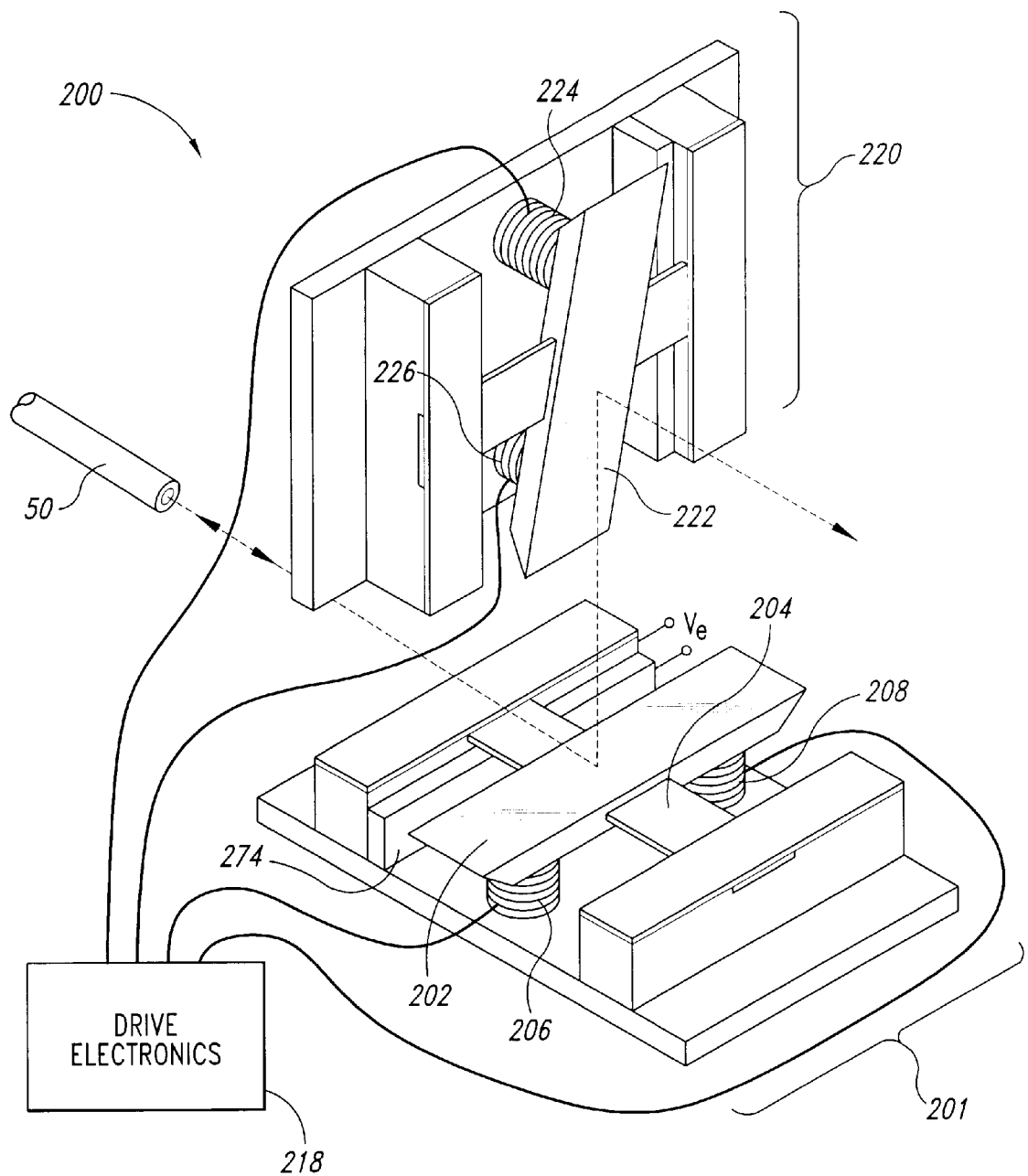
FIG. 9 is an isometric view of a horizontal scanner and a vertical scanner suitable for use in the scanning assembly of FIG. 8.

One skilled in the art will recognize that several components of the scanner 200 have been omitted from the FIG. 9 for clarity of presentation. For example, the horizontal and vertical scanners 201, 220 are typically mounted in fixed relative positions to a frame. Additionally, the scanner 200 typically includes one or more turning mirrors that direct the beam such that the beam strikes each of the mirrors a plurality of times to increase the angular range of scanning.

Returning to FIG. 8, the operation of the system, including the correction mirror 100 will now be described. For purposes of clarity for the following discussion, it will be assumed that, at the "zero" positions of the mirrors 100, 56, 58 (i.e., the mirrors are centered), the beam 80 is centered in the plane 66. One skilled in the art will recognize that the zero position can be selected arbitrarily in most cases with straightforward adaptations of the angles and paths described below.

As can be seen by ray tracing, the position of the beam 80 in the plane 66 will be a function of the angular deflections from the turning mirror 100, the horizontal scanner 56, and the vertical scanner 58. The actual vector angle of the beam 80 at any point in time can then be determined by vector addition. In most cases, the desired vertical portion of the scan pattern will be a "stair step" scan pattern, as shown by the broken line in FIG. 10.

Figure 4A:
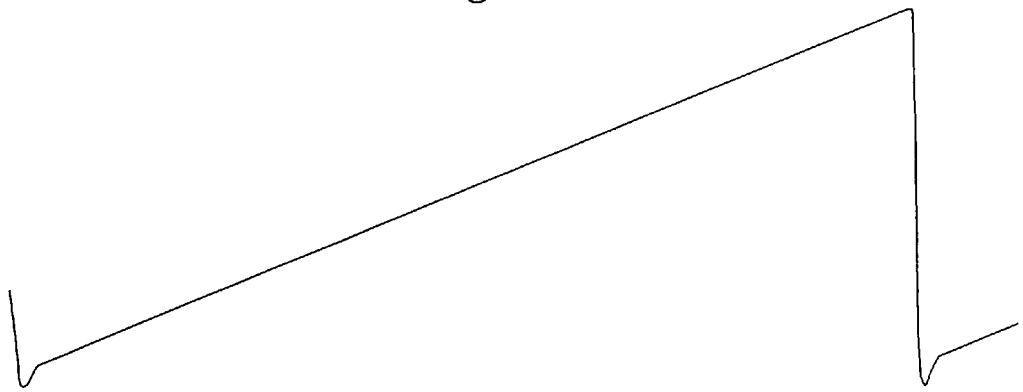
FIG. 4A is a signal-timing diagram of a vertical scanner in the scanning assembly of FIG. 1.
Figure 4B:
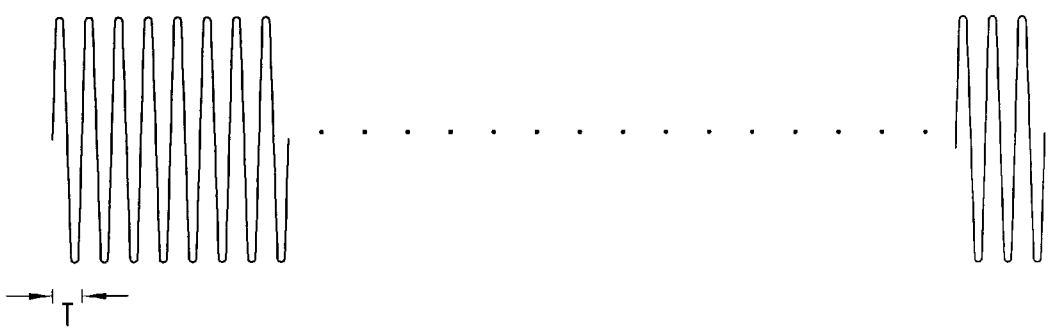
FIG. 4B is a signal-timing diagram of a drive signal for driving a horizontal scanner in the scanning assembly of FIG. 1.
Figure 10:
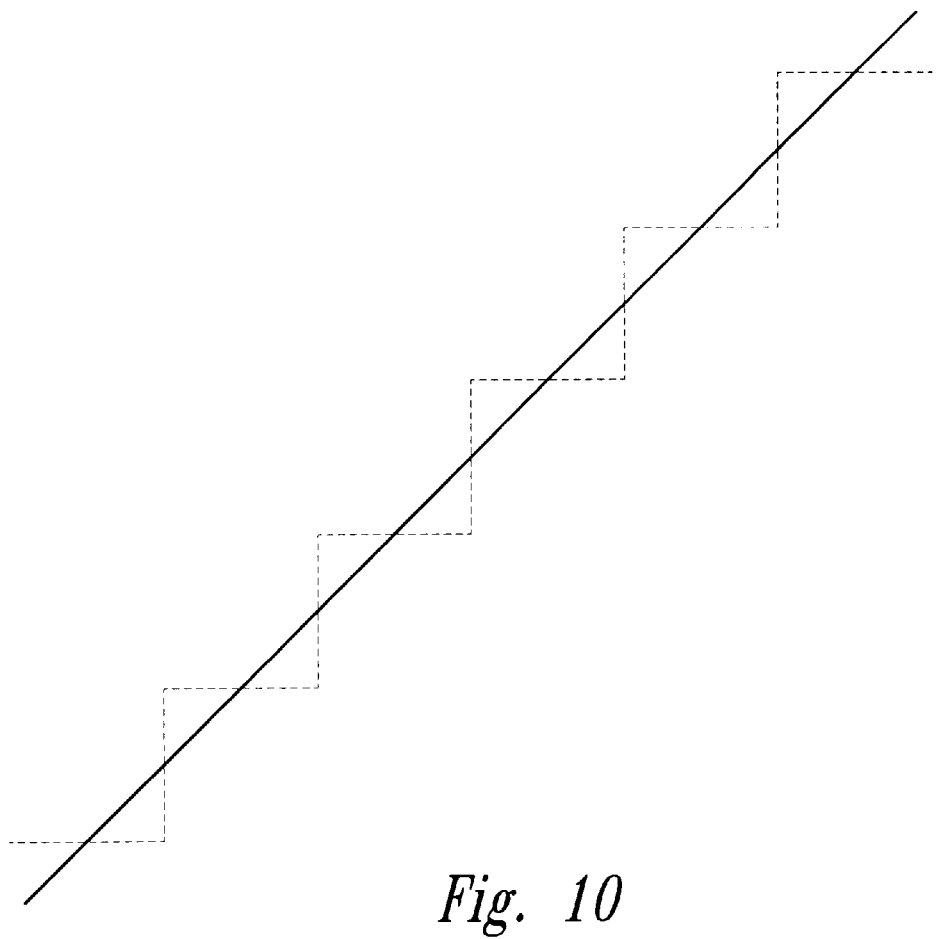
FIG. 10 is a signal-timing diagram comparing a ramp signal with a desired signal for driving the vertical scanner.

If the turning mirror 100 is disabled, the pattern traced by the ray will be the same as that described above with respect to FIGS. 3–5. As shown in FIG. 10, the actual vertical scan portion of the pattern, shown in solid line, will be an approximate ramp, rather than the desired stair step pattern.

One approach to providing the stair step pattern would be to drive the vertical scanner 58 with a stair step voltage. However, because the vertical mirror is a physical system and the stair step involves discontinuous motion, the vertical mirror will not follow the drive signal exactly. Instead, as the vertical mirror attempts to follow the stair step pattern, the vertical mirror will move at a maximum rate dictated largely by the size and weight of the vertical mirror, the material properties of the mirror support structure, the peak voltage or current of the driving signal, and electrical properties of the driving circuitry. For typical vertical scan mirror size, configuration, scan angle and driving voltage, the vertical scanner 58 is limited to frequencies on the order of 100 to 3000 Hz. The desired scan pattern has frequency components far exceeding this range. Consequently, driving the vertical scanner 58 with a stair step driving signal produces a vertical scan pattern that deviates significantly from the desired pattern.

Figure 8:
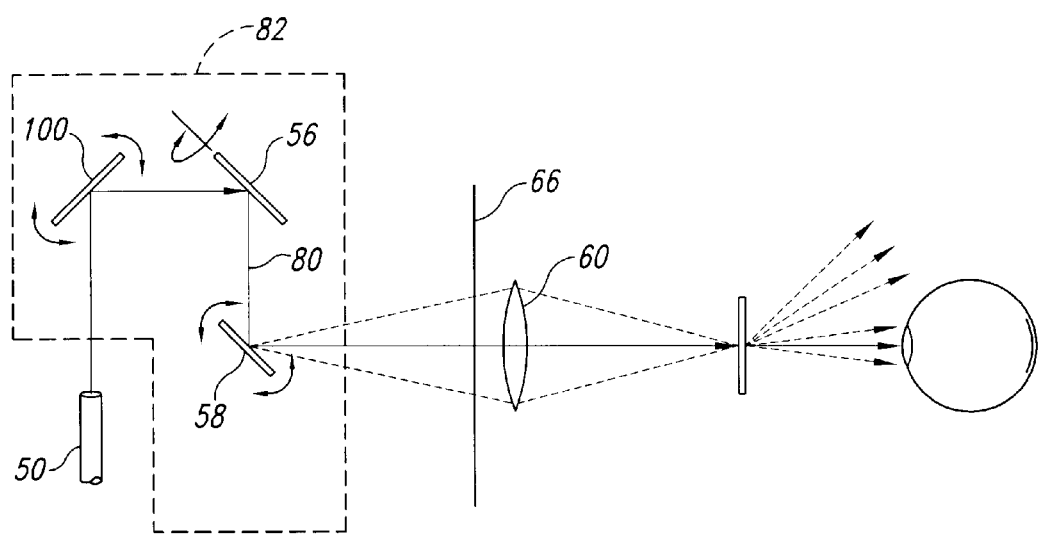
FIG. 8 is a diagrammatic representation of a scanning assembly within the scanning display of FIG. 6, including a correction mirror.

To reduce this problem, the embodiment of FIG. 8 separates the vertical scan function into two parts. The overall vertical scan is then a combination of a large amplitude ramp function at about 60 Hz and a small amplitude correction function at twice the horizontal rate (e.g., about 30 kHz). The vertical scanner 58 can produce the large amplitude ramp function easily, because the 60 Hz frequency is well below the response frequency of typical scanning mirrors. The correction mirror 100 operates at a much higher frequency; however, the overall angular swing of the correction mirror 100 is very small.

Figure 5:
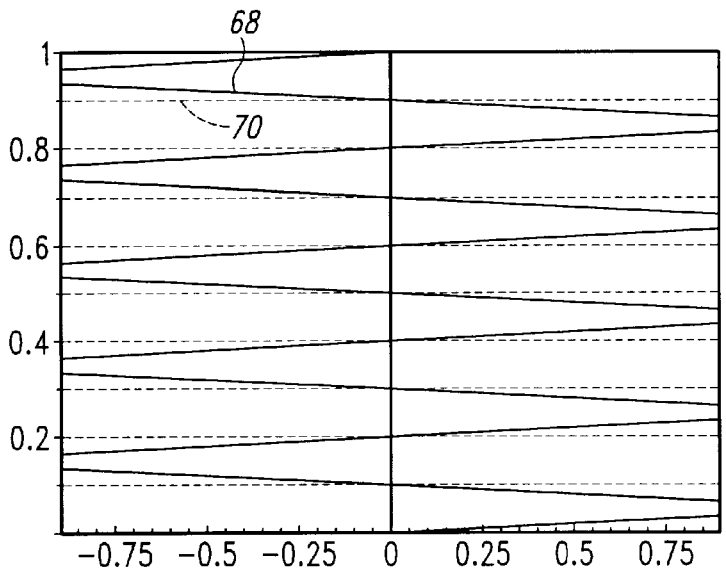
FIG. 5 is a signal position diagram showing the path followed by the scanned beam in response to the signals of FIGS. 4A and B.
Figure 11:
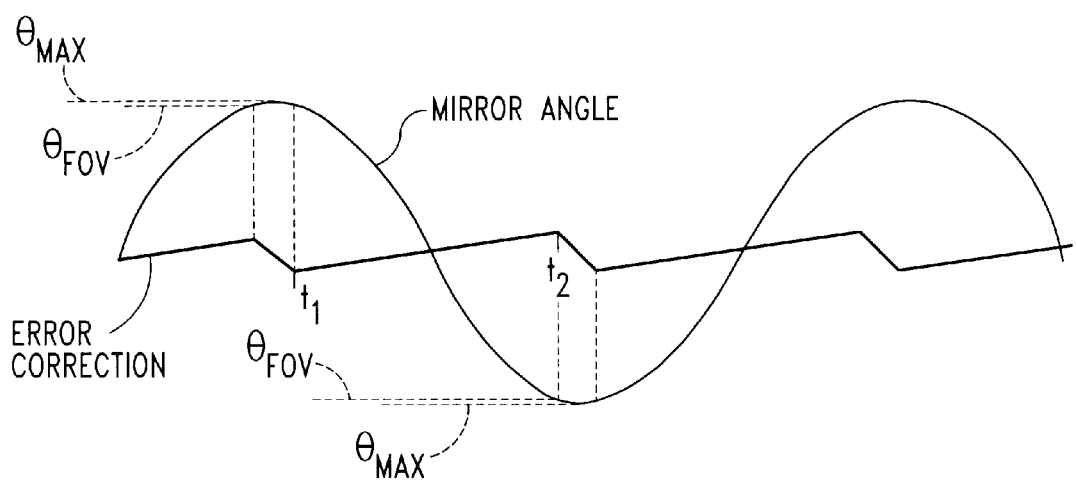
FIG. 11 is a signal timing diagram showing positioning error and correction for the vertical scanning position.

As can be seen from the signal timing diagrams of FIG. 10, the correction mirror 100 travels from approximately its maximum negative angle to its maximum positive angle during the time that the horizontal scanner scans from the one edge of the field of view to the opposite edge (i.e. from time $t_1$ to $t_2$ in FIG. 11). The overall correction angle, as shown in FIG. 5, is defined by the amount of downward travel of the vertical scan mirror during a single horizontal scan. The correction angle will vary for various configurations of the display; however, the correction angle can be calculated easily.

For example, for a display having 1280 vertical lines, and a total mechanical vertical scan angle of 10 degrees, the angular scan range for each line is about 0.008 degrees (10/1280=0.0078125). Assuming the vertical scanner travels this entire distance during the horizontal scan an error correction to be supplied by the correction mirror 100 of about plus or minus 0.0039 degrees. The angular correction is thus approximately θ/N, where θ is the vertical scan angle and N is the number of horizontal lines. This number may be modified in some embodiments. For example, where the horizontal scanner is a resonant scanner, the correction angle may be slightly different, because the horizontal scanner will use some portion of the scan time to halt and begin travel in the reverse direction, as the scan reaches the edge of the field of view.

As can be seen from the timing diagrams of FIGS. 5 and 10, the correction mirror 100 will translate the beam vertically by about one half of one line width at a frequency of twice that of the horizontal scanner 56. For a typical display at SVGA image quality, the horizontal scanner 56 will resonate at about 15 kHz. Thus, for a typical display, the correction scanner 100 will pivot by about one-half of one degree at about 30 kHz. One skilled in the art will recognize that, as the resolution of the display increases, the scan rate of the horizontal scanner 56 increases. The scan rate of the correction mirror 100 will increase accordingly; but, the pivot angle will decrease. For example, for a display having 2560 lines and an overall scan of 10 degrees, the scan rate of the correction mirror 100 will be about 60 kHz with a pivot angle of about 0.002 degrees.

Figure 12:
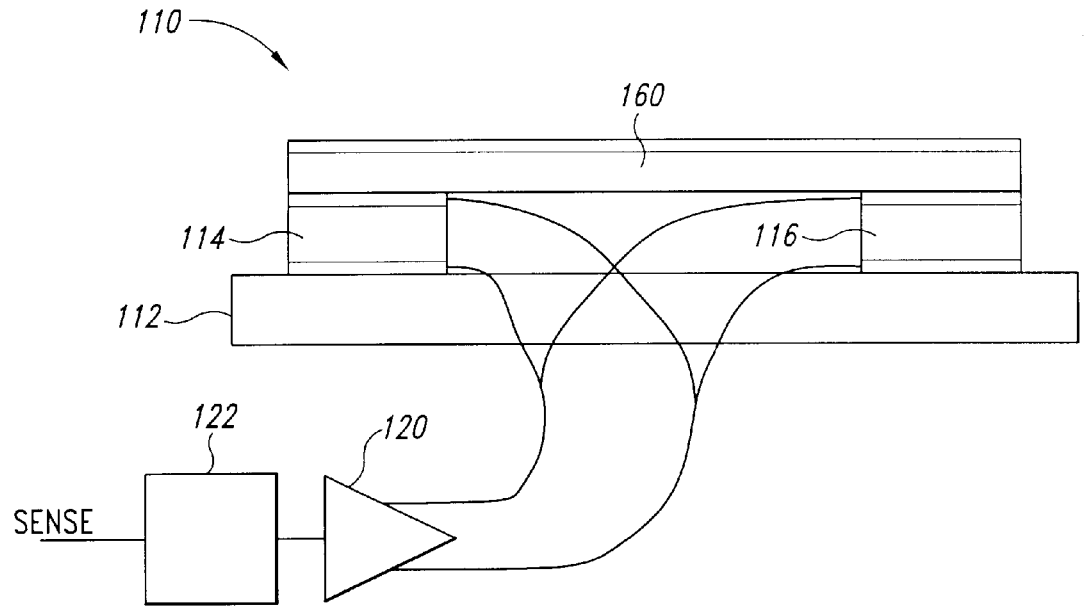
FIG. 12 is a side cross sectional view of a piezoelectric correction scanner.

FIG. 12 shows a piezoelectric scanner 110 suitable for the correction mirror 100 in some embodiments. The scanner 110 is formed from a platform 112 that carries a pair of spaced-apart piezoelectric actuators 114, 116. The correction mirror 100 is a metallized, substantially planar silicon substrate that extends between the actuators 114, 116. The opposite sides of the piezoelectric actuators 114, 116 are conductively coated and coupled to a drive amplifier 120 such that the voltages across the actuators 114, 116 are opposite. As is known, piezoelectric materials deform in the presence of electric fields. Consequently, when the drive amplifier 120 outputs a voltage, the actuators 114, 116 apply forces in opposite directions to the correction mirror 100, thereby causing the correction mirror 100 to pivot. One skilled in the art will recognize that, although the piezoelectric actuators 114, 116 are presented as having a single set of electrodes and a single layer of piezoelectric material, the actuators 114, 116 would typically be formed from several layers. Such structures are used in commercially available piezoelectric devices to produce relatively large deformations.

A signal generator circuit 122 provides the driving signal for the drive amplifier 120 in response to the detected position of the horizontal scanner 56. The principal input to the circuit 122 is a sense signal from a sensor coupled to the horizontal scanner 56. The sense signal can be obtained in a variety of approaches. For example, as described in U.S. Pat. No. 5,648,618 to Neukermanns et al., entitled MICROMACHINED HINGE HAVING AN INTEGRAL TORSIONAL SENSOR, which is incorporated herein by reference, torsional movement of a MEMs scanner can produce electrical outputs corresponding to the position of the scanning mirror. Alternatively, the position of the mirror may be obtained by mounting piezoelectric sensors to the scanner, as described in U.S. Pat. No. 5,694,237 to Melville, entitled POSITION DETECTION OF MECHANICAL RESONANT SCANNER MIRROR, which is incorporated herein reference. In other alternatives, the position of the beam can be determined by optically or electrically monitoring the position of the horizontal or vertical mirrors or by monitoring current induced in the mirror drive coils.

When the sense signal indicates that the horizontal scanner 56 is at the edge of the field of view, the circuit 122 generates a ramp signal that begins at its negative maximum and reaches its zero crossing point when the horizontal scanner reaches the middle of the field of view. The ramp signal then reaches its maximum value when the horizontal scan reaches the opposite edge of the field of view. The ramp signal returns to its negative maximum during the interval when the horizontal scan slows to a halt and begins a return sweep. Because the circuit 122 can use the sense signal as the basic clock signal for the ramp signal, timing of the ramp signal is inherently synchronized to the horizontal position of the scan. However, one skilled in the art will recognize that, for some embodiments a controlled phase shift of the ramp signal relative to the sense signal will optimize performance. One skilled in the art will also recognize that where the correction mirror is scanned resonantly, as described below with reference to FIG. 16, the ramp signal can be replaced by a sinusoidal signal, that can be obtained simply by frequency doubling, amplifying and phase shifting the sense signal.

The vertical movement of the beam induced by the correction mirror 100 offsets the movement of the beam caused by the vertical scanner 58, so that the beam remains stationary along the vertical axis during the horizontal scan. During the time the horizontal scan is out of the field of view, beam travels vertically in response to the correction mirror 100 to the nominal position of the next horizontal scan.

Figure 13A:
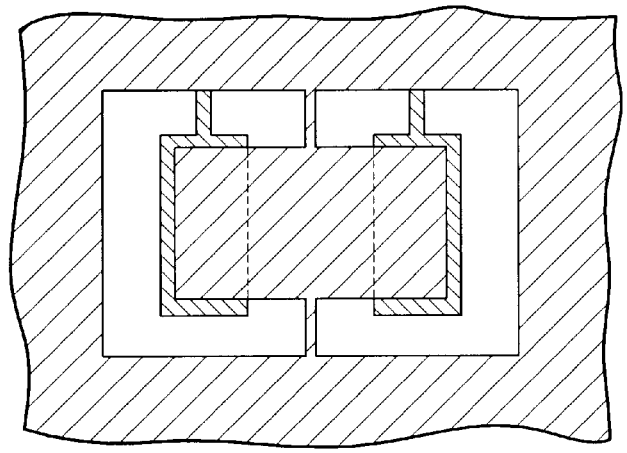
FIG. 13A is a top plan view of a microelectromechanical (MEMs) correction scanner.
Figure 13B:
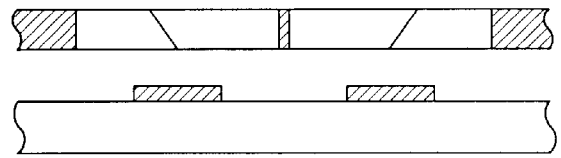
FIG. 13B is a side cross-sectional view of the MEMs correction scanner of FIG. 13A showing capacitive plates and their alignment to the scanning mirror.

As can be seen from the above discussion, the addition of the piezoelectrically driven correction mirror 100 can reduce the raster pinching significantly with a ramp-type of motion. However, in some applications, it may be undesirable to utilize ramp-type motion. One alternative embodiment of a scanner 130 that can be used for the correction mirror 100 is shown in FIGS. 13A and 13B.

The scanner 130 is a resonant microelectromechanical (MEMs) scanner, fabricated similarly to those described in the Neukermans '790 patent, except that processing is simplified because the scanner 130 is uniaxial. Alternatively, the scanner 130 can be a mechanically resonant scanner very similar to the horizontal scanner 54 of FIG. 9; however, in such a scanner it is preferred that the dimensions and material properties of the plate and mirror be selected to produce resonance at about 30 kHz, which is twice the resonant frequency of the horizontal scanner 200. Further, the materials and mounting are preferably selected so that the scanner 130 has a much lower Q than the Q of the horizontal scanner 56. The lower Q allows scanner 130 to operate over a broader range of frequencies, so that the scanner 130 can be tuned to an integral multiple of the horizontal scan frequency.

Figure 14:
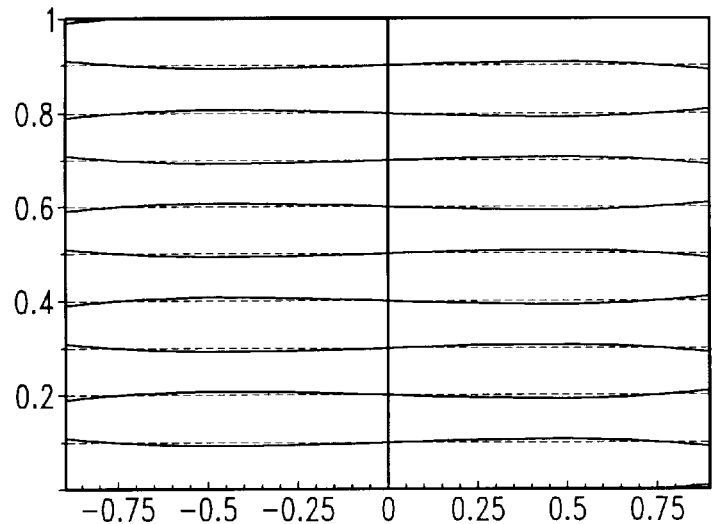
FIG. 14 shows corrected scan position using a sinusoidally driven scanner through 90% of the overall scan.

The use of the resonant scanner 130 can reduce the complexity of the electrical components for driving the scanner 130. However, because the scanner 130 is resonant, it will tend to have a sinusoidal motion, rather than the ramp-type motion described above. However, if the frequency, phase, and amplitude of the sinusoidal motion are selected appropriately, the correction mirror 100 can reduce the pinch error significantly. For example, FIG. 14 shows correction of the raster signal with a sinusoidal motion of the correction mirror where the horizontal field of view encompasses 90 percent of the overall horizontal scan angle. One skilled in the art will recognize that the error in position of the beam can be reduced further if the field of view is a smaller percentage of the overall horizontal scan angle. Moreover, even further reductions in the scan error can be realized by adding a second correction mirror in the beam path, although this is generally undesirable due to the limited improvement versus cost. Another approach to reducing the error is to add one or more higher order harmonics to the scanner drive signal so that the scanning pattern shifts from a sinusoidal scan closer to a triangle wave.

Figures 15, 16:
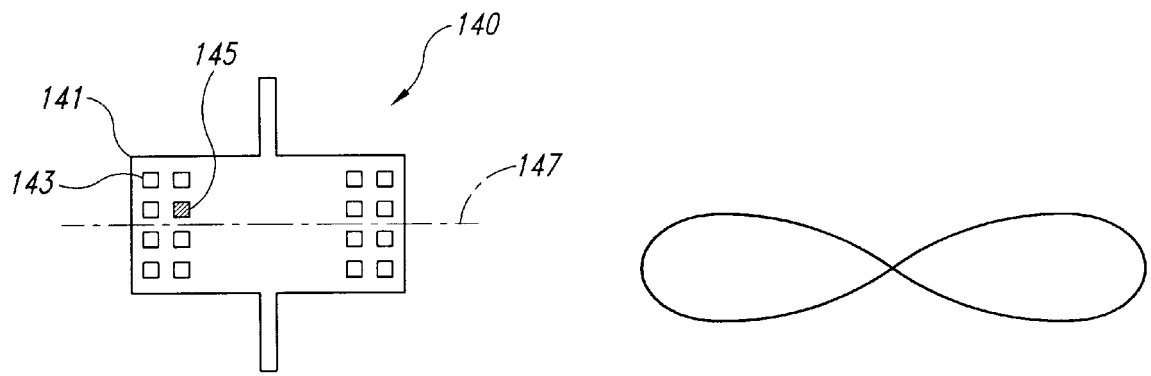
FIG. 15 shows an alternative embodiment of a reduced error scanner where scan correction is realized by adding a vertical component to the horizontal mirror.
FIG. 16 is a position diagram showing the scan path of a beam deflected by the scanner of FIG. 15.

Another alternative embodiment of a reduced error scanner 140 is shown in FIG. 15 where the scan correction is realized by adding a vertical component to a horizontal mirror 141. In this embodiment, the horizontal scanner 140 is a MEMs scanner having an electrostatic drive to pivot the scan mirror. The horizontal scanner 140 includes an army of locations 143 at which small masses 145 may be formed.

The masses 145 may be deposited metal or other material that is formed in a conventional manner, such as photolithography. The masses 143 are located asymmetrically about a centerline 147 of the mirror 141. The masses 145 provide a component to scan the correction along the vertical axis by pivoting about an axis orthogonal to its primary axis; as can be seen in FIG. 16, the vertical scan frequency is double the horizontal scan frequency, thereby producing a Lissajous or "bow-tie" overall scan pattern. The masses 145 may be actively varied (e.g. by laser ablation) to tune the resonant frequency of the vertical component. This embodiment allows correction without an additional mirror, but typically requires matching the resonant frequencies of the vibration and the horizontal scanner.

Figure 17:
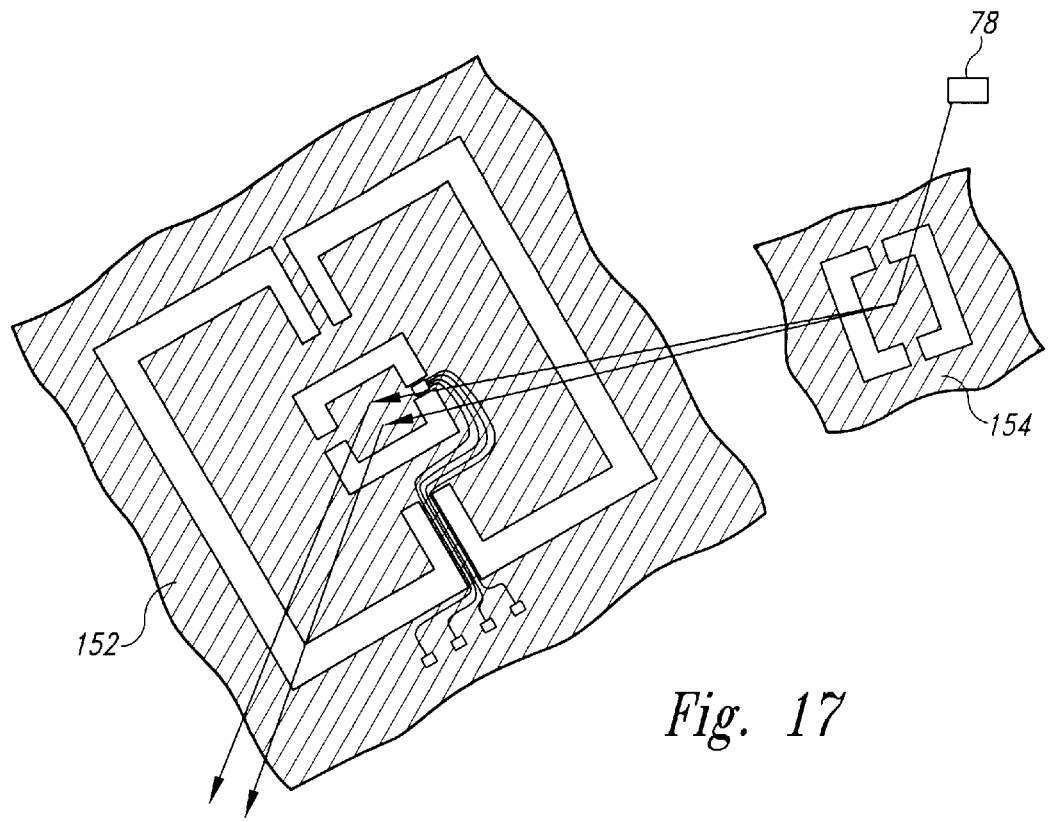
FIG. 17 is a diagrammatic view of a scanning system, including a biaxial microelectromechanical (MEMs) scanner and a MEMs correction scanner.

As shown in FIG. 17, another embodiment of a scanner 150 according to the invention employs a biaxial scanner 152 as the principal scan component, along with a correction scanner 154. The biaxial scanner 152 is a single mirror device that oscillates about two orthogonal axes. Design, fabrication and operation of such scanners are described for example in the Neukermans '790 patent and in Kiang, et al., MICROMACHINED MICROSCANNERS FOR OPTICAL SCANNING, SPIE Proceedings on Miniaturized Systems with Micro-Optics and Micromachines II, Vol. 3008, pp. 82–90 which is incorporated herein by reference.

The correction scanner 154 is preferably a MEMs scanner, although other types of scanners, such as piezoelectric scanners may also be within the scope of the invention. As described above, the correction mirror 154 can scan sinusoidally to remove a significant portion of the scan error; or, the correction mirror can scan in a ramp pattern for more precise error correction.

Light from the light source 78 strikes the correction mirror 154 and is deflected by a correction angle as described above. The light then strikes the biaxial scanner 152 and is scanned horizontally and vertically to approximate a raster pattern, as described above with reference to FIGS. 3–5. As described above, the overall pattern more closely approximates a raster pattern.

Figure 18:
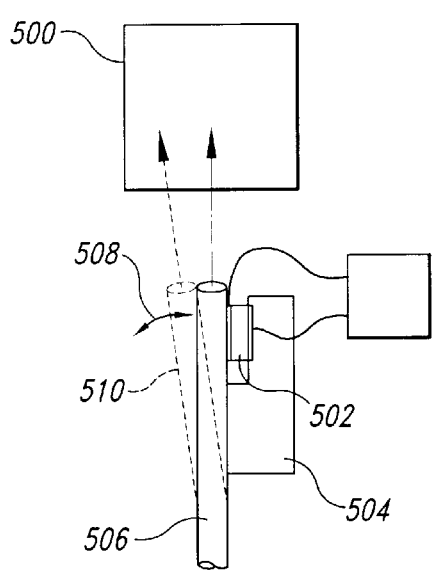
FIG. 18 is a diagrammatic view of a correction scanner that shifts an input beam by shifting the position or angle of the input fiber.

Another embodiment of a display according to the invention, shown in FIG. 18, eliminates the correction mirror 100 by physically shifting the input beam laterally relative to the input of an optical system 500. In the embodiment of FIG. 18, a piezoelectric driver 502 positioned between a frame 504 and an input fiber 506 receives a drive voltage at a frequency twice that of the horizontal scan frequency. Responsive to the drive voltage, the piezoelectric driver 502 deforms. Because the fiber 506 is bonded to the piezoelectric driver 502, deformation of the piezoelectric driver 502 produces corresponding shifting of the fiber 506 as indicated by the arrow 508 and shadowed fiber 510. One skilled in the art will recognize that, depending upon the characteristics of the optical system 500, the piezoelectric driver 502 may produce lateral translation of the fiber 506 or angular shifting of the fiber 506 output. The optical system 500 then translates movement of the fiber output into movement of the perceived pixel location as in the previously described embodiments. While the embodiment of FIG. 18 utilizes translating a fiber, the invention is not so limited. For example some applications may incorporate translation of other sources, such as LEDs or laser diodes.

Figure 19:
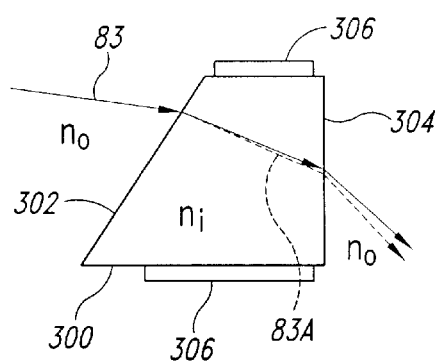
FIG. 19 is a diagrammatic view of a correction scanner that includes an electro-optic crystal that shifts the input beam in response to an electrical signal.

Although the embodiment of FIG. 18 shifts the input beam by shifting the position or angle of the input fiber other methods of shifting the input beam may be within the scope of the invention. For example, as shown in FIG. 19, an electro-optic crystal 300 shifts the input beam 83 in response to an electrical signal. In this embodiment, the beam 83 enters a first face 302 of a trapezoidally shaped electro-optic crystal 300, where refraction causes a shift in the direction of propagation. When the beam 83 exits through a second face 304, refraction produces a second shift in the direction of propagation. At each face, the amount of changes in the direction of propagation will depend upon difference in index of refraction between the air and the crystal 300. As is known, the index of refraction of electro-optic crystals is dependent upon the electric field through the crystal. A voltage applied across the crystal 300 through a pair of electrodes 306 can control the index of refraction of the crystal. Thus, the applied voltage can control the angular shift of the beam 83 as it enters and exits the crystal 300 as indicated by the broken line 83A. The amount of shift will correspond to the applied voltage. Accordingly, the amount of shift can be controlled by controlling the voltage applied to the electrodes 306. The crystal 300 thus provides a voltage controlled beam shifter that can offset raster pinch.

Figure 20:
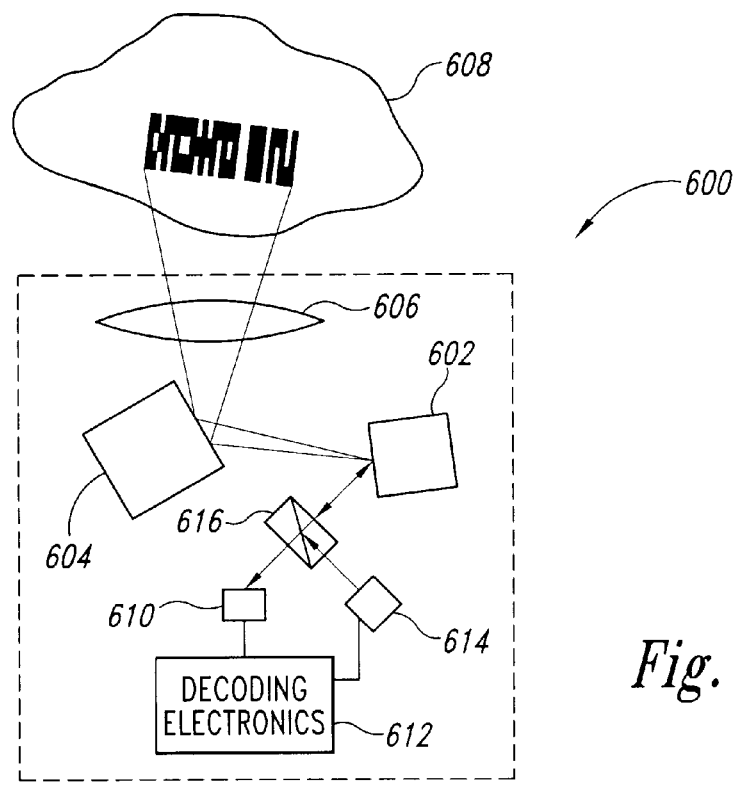
FIG. 20 is a diagrammatic view of an imager that acquires external light from a target object.

Although the embodiments described herein have been displays, other devices or methods may be within the scope of the invention. For example, as shown in FIG. 20, an imager 600 includes a biaxial scanner 602 and correction scanner 604 that are very similar to the scanners 152, 154 of FIG. 17. The imager 600 is an image collecting device that may be the input element of a digital camera, bar code reader, or other image acquisition device. To allow the imager 600 to gather light efficiently, the imager 600 includes gathering optics 606 that collect and transmit light from a target object 608 outside of the imager 600 onto the correction scanner 604. The gathering optics 606 are configured to have a depth of field, focal length, field of view and other optical characteristics appropriate for the particular application. For example, where the imager 600 is a two dimensional symbology reader, the gathering optics may be optimized for red or infrared light and the focal length may be in the order of 10–50 cm.

The correction scanner 604 redirects light received from the gathering optics 606 as described above for the display embodiments, so that the gathered light has a correction component before it reaches the biaxial scanner 602. The biaxial scanner scans through a substantially raster pattern to collect light arriving at the gathering optics from a range of angles and to redirect the light onto a stationary photodetector 610. Movement of the biaxial scanner 602 thus translates to imaging successive points of the target object 608 onto the photodetector 610. The photodetector 610 converts light energy from the scanner 602 into electrical signals that are received by decoding electronics 612. Where the imager 600 is a symbology reader, the decoding electronics 612 may include symbol decoding and storing circuitry. Where the imager is a portion of a camera, the decoding electronics 612 may include a digital-to-analog converter, a memory device and associated electronics for storing a digital representation of the scanned target object 608.

Another feature of the imager 600 shown in FIG. 20 is an illumination source 614 that provides light for illuminating a target object. The illumination source 614 may be one of many types, depending upon the application. For example, where the imager 600 is a symbol reader, the illumination source 614 may be an infrared or red light emitter that emits a beam of light into a beam splitter 616. The beam splitter 616 directs the illuminating light beam onto the biaxial scanner 602 where the illuminating light is redirected to the correction scanner 604. Because the illuminating light is collinear with the path of light from the target object 608, the illuminating light strikes the target object 608 at the same location that is imaged by the photodetector 610. The illuminating light is reflected by the target object 608 in a pattern corresponding to the reflectivity of the target object 608. The reflected illuminating light travels to the photodetecor 610 and provides light that can be used by the photodetector 610 to image the target object 608.

Figure 21:
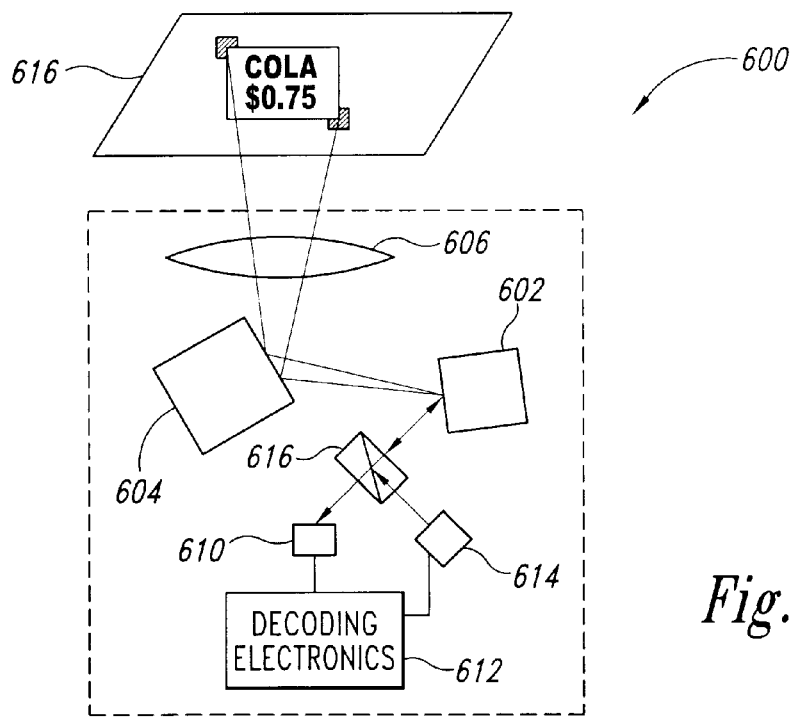
FIG. 21 is a diagrammatic view of an alternative embodiment of the imager of FIG. 20 that also projects a visible image.

In one application of the imager 600 of FIG. 20, the illumination source 614 is a visible, directly modulatable light source, such as a red laser diode or a visible wavelength light emitting diode (LED). As shown in FIG. 21, the illumination source 614 can thus produce a visible image for the user. In the exemplary embodiment of FIG. 21, the imager can operate as a symbology scanner to identify information contained in a symbol on the target object 608. Once the decoding electronics 612 identifies the information represented by the symbol, the decoding electronics 612 identifies a desired image to be viewed, such as an item price and identity. The decoding electronics 612 modulates the drive current of the illumination source 614 to modulate the intensity of the emitted light according to the desired image. When the user directs the imager 600 toward a screen 616, the illumining light is scanned onto the screen 616 as described above. Because the illuminating light is modulated according the desired image, the light reflected from the screen 616 is spatially modulated according to the desired image. The imager 600 thus acts as an image projector in addition to acquiring image data.

Figure 22:
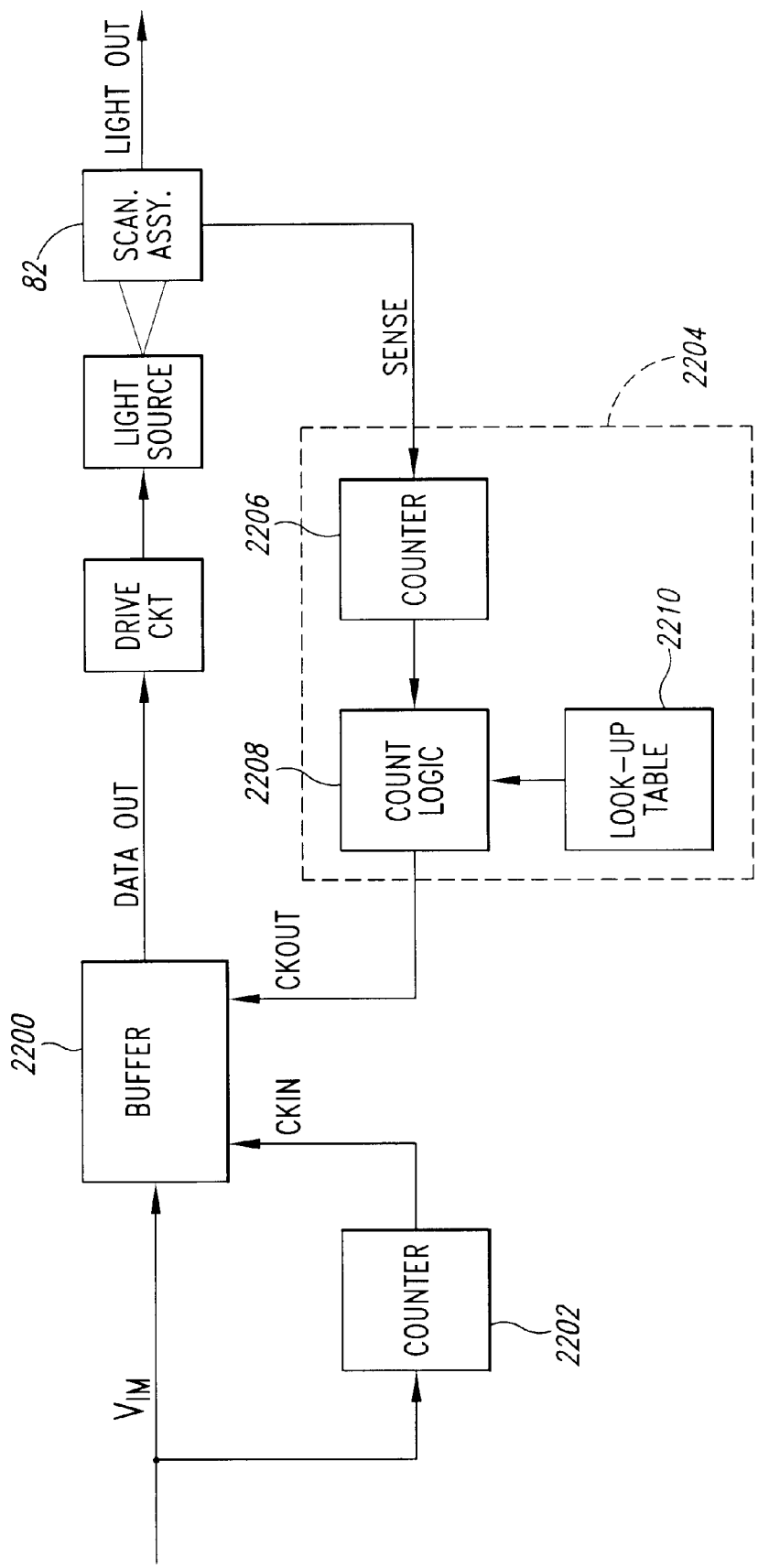
FIG. 22 is a system block diagram showing handling of data to store data in a memory matrix while compensating for nonlinear scan speed of the resonant mirror.
Figure 23:
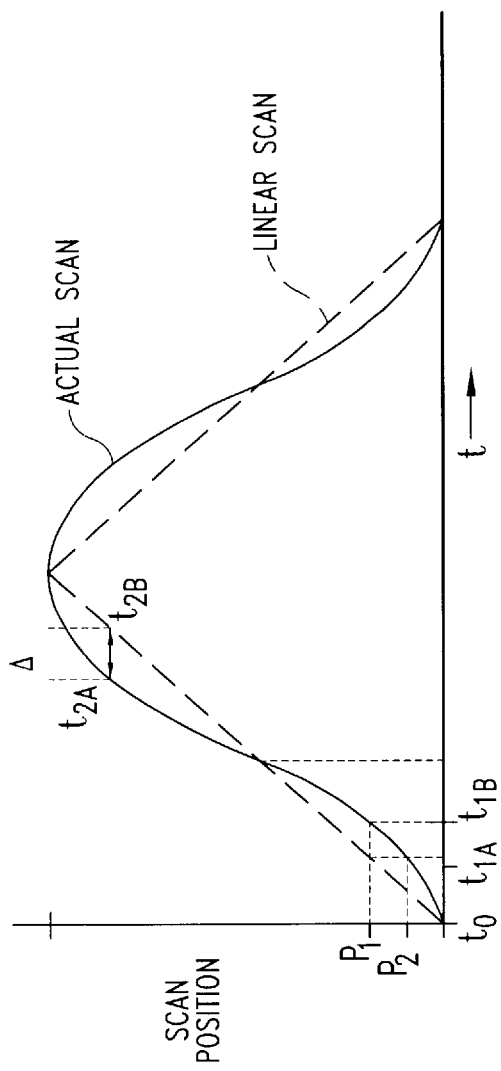
FIG. 23 is a signal timing diagram showing deviation of a sinusoidal scan position versus time from the position of a linear scan.

In addition to compensating for raster pinch, one embodiment of the scanning system, shown in FIG. 22, also addresses effects of the nonlinearity of resonant and other nonlinear scanning systems. As shown by broken line in FIG. 23, the timing of incoming data is premised upon a linear scan rate. That is, for equally spaced subsequent locations in a line, the data arrive at constant intervals. A resonant scanner, however, has a scan rate that varies sinusoidally, as indicated by the solid line. For a start of line beginning at time to (note that the actual start of scan for a sinusoidal scan would likely be delayed slightly as described above with respect to FIG. 14), the sinusoidal scan initially lags the linear scan. Thus, if image data for position $P_1$ arrive at time $t_{1A}$, the sinusoidal scan will place the pixel at position $P_2$.

Figure 24:
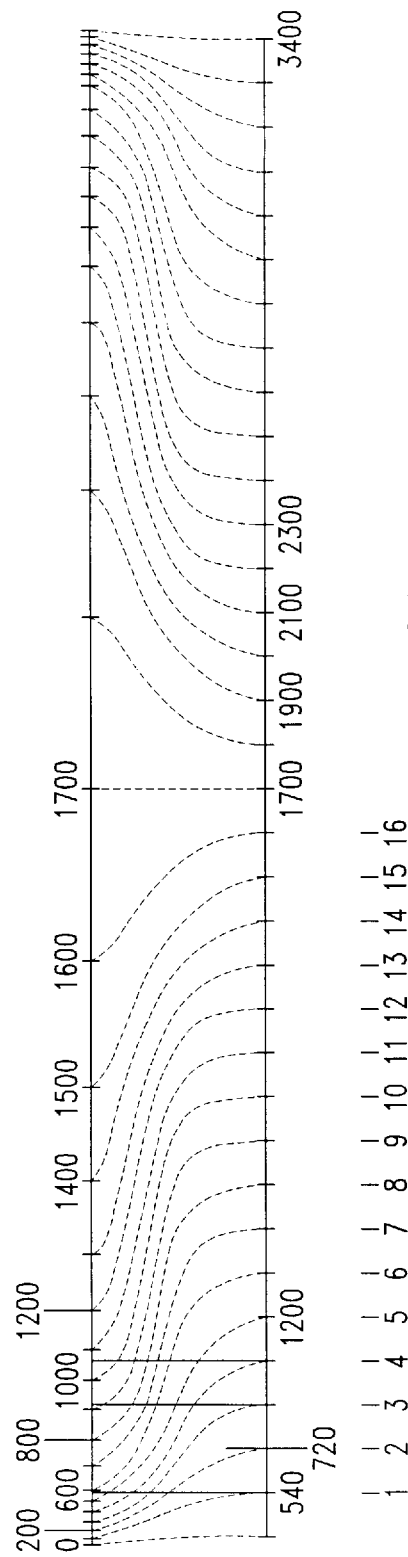
FIG. 24 is a diagram showing diagrammatically how a linear set of counts can map to scan position for a sinusoidally scan.

To place the pixel correctly, the system of FIG. 22 delays the image data until time $t_{1B}$, as will now be described with reference to FIGS. 22 and 24. Arriving image data $V_{IM}$ are clocked into a line or frame buffer 2200 by a counter circuit 2202 in response to a horizontal synchronization component of the image data signal. The counter circuit 2202 is a conventional type circuit, and provides an input clock signal having equally spaced pulses to clock the data into the buffer 2200.

A feedback circuit 2204 controls timing of output from the buffer 2200. The feedback circuit 2204 receives a sinusoidal or other sense signal from the scanning assembly 82 and divides the period of the sense signal with a high speed second counter 2206. A logic circuit 2208 produces an output clock signal in response to the counter output Unlike the input clock signal, however, pulses of the output clock signal are not equally spaced. Instead, the pulse timing is determined analytically by comparing the timing of the linear signal of FIG. 23 to the sinusoidal signal. For example, for a pixel to be located at position $P_1$, the logic circuit 2208 provides an output pulse at time $t_{1B}$, rather that time $t_{1A}$, as would be the case for a linear scan rate.

The logic circuit 2208 identifies the count corresponding to a pixel location by accessing a look-up table in a memory 2210. Data in the look-up table are defined by dividing the scanning system period into many counts and identifying the count corresponding to the proper pixel location. FIG. 24 shows this evaluation graphically for a 35-pixel line. One skilled in the art will recognize that this example is simplified for clarity of presentation. A typical line may include hundreds or even thousands of pixels. As can be seen, the pixels will be spaced undesirably close at the edges of the field of view and undesirably far at the center of the field of view. Consequently, the image will be compressed near the edges of the field of view and expanded near the middle, forming a distorted image.

As shown by the upper line, pixel location varies nonlinearly for pixel counts equally spaced in time. Accordingly, the desired locations of each of the pixels, shown by the lower line, actually correspond to nonlinearly spaced counts. For example, the first pixel in the upper and lower lines arrives at the zero count and should be located in the zero count location. The second pixel arrives at the 100 count, but, should be positioned at the 540 count location. Similarly, the third pixel arrives at count 200 and is output at count 720. One skilled in the art will recognize that the figure is merely representative of the actual calculation and timing. For example, some output counts will be higher than their corresponding input counts and some counts will be lower. Of course, a pixel will not actually be output before its corresponding data arrives. To address this condition, the system of FIG. 22 actually imposes a latency on the output of data, in a similar fashion to synchronous memory devices. For the example of FIG. 24, a single line latency (3400 count latency) would be ample. With such a latency, the first output pixel would occur at count 3400 and the second would occur at count 3940.

Figure 25:
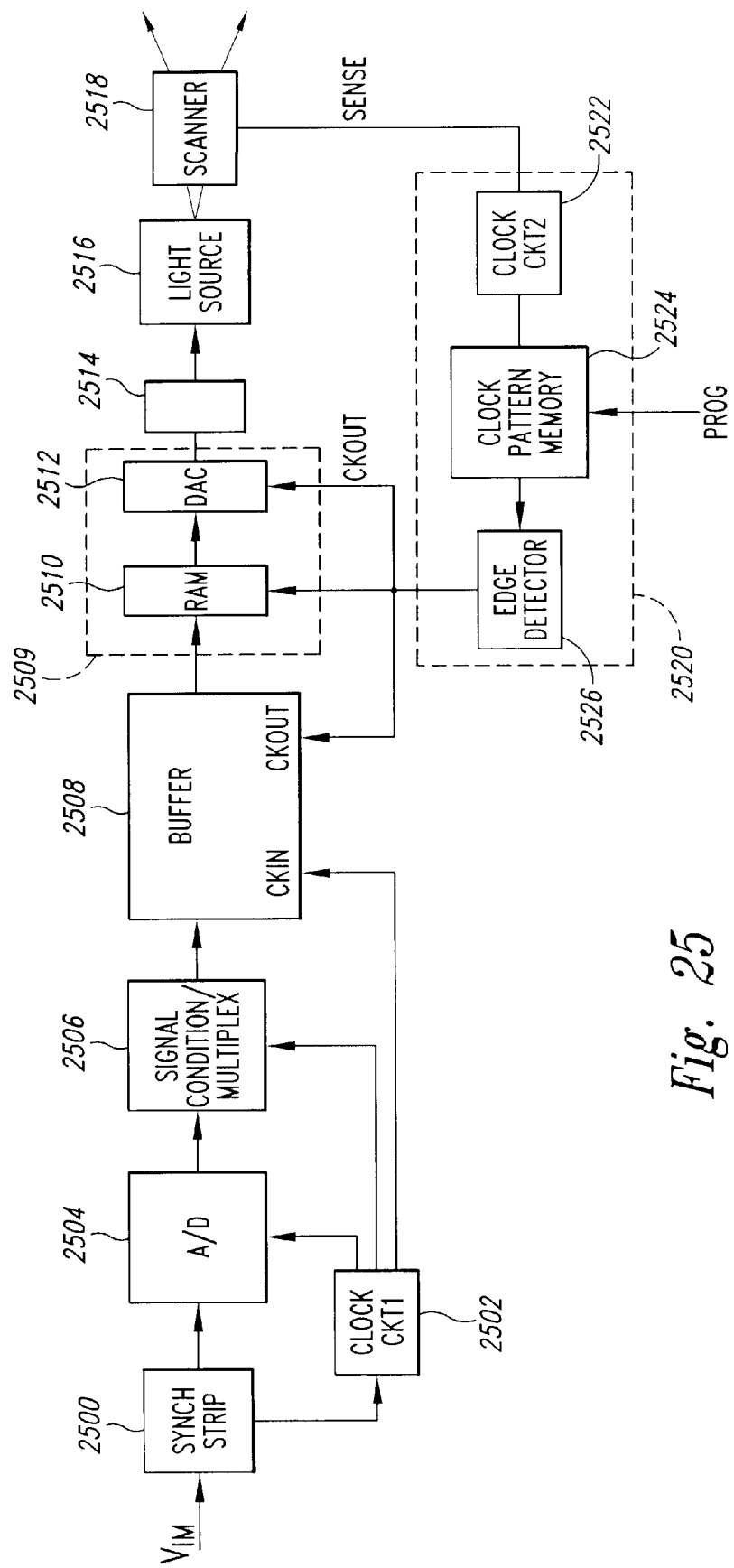
FIG. 25 is a block diagram showing generation of an output clock to retrieve data from a memory matrix while compensating for nonlinear scan speed of the resonant mirror.

FIG. 25 shows an alternative approach to placing the pixels in the proper locations. This embodiment produces a corrected clock from a pattern generator rather that a counter to control clocking of output data. A synch signal stripper 2500 strips the horizontal synchronization signal from an arriving image signal $V_{IM}$. Responsive to the synch signal, a phase locked loop 2502 produces a series of clock pulses that are locked to the synch signal. An A/D converter 2504, driven by the clock pulses, samples the video portion of the image signal to produce sampled input data. The sampling rate will depend upon the required resolution of the system. In the preferred embodiment, the sampling rate is approximately 40 Mhz. A programmable gate array 2506 conditions the data from the A/D converter 2504 to produce a set of image data that are stored in a buffer 2508. One skilled in the art will recognize that, for each horizontal synch signal, the buffer will receive one line of image data. For a 1480×1024 pixel display, The system will sample and store 1480 sets of image data during a single period of the video signal.

Once each line of data is stored in the buffer 2508, the buffer is clocked to output the data to a RAMDAC 2509 that includes a gamma correction memory 2510 containing corrected data. Instead of using the buffer data as a data input to the gamma correction memory 2510, the buffer data is used to produce addressing data to retrieve the corrected data from the gamma correction memory 2510. For example, for a set of image data corresponding to a selected image intensity I1 identifies a corresponding location in the gamma correction memory 2510. Rather than output the actual image data, the gamma correction memory 2510 outputs a set of corrected data that will produce the proper light intensity at the user's eye. The corrected data is determined analytically and empirically by characterizing the overall scanning system, including the transmissivity of various components, the intensity versus current response of the light source, diffractive and aperture effects of the components and a variety of other system characteristics.

The corrected data output from the gamma correction memory 2510 drives a D/A converter 2512 to produce a gamma corrected analog signal. A scanner drive circuit 2514 amplifies and processes the corrected analog signal to produce an input signal to a light source 2516. In response the light source 2516 outputs light modulated according to the corrected data from the gamma correction memory 2510. The modulated light enters a scanner 2518 to produce scanned, modulated light for viewing.

The clock signal that drives the buffer 2508, correction memory 2510, and D/A converter 2512 comes from a corrected clock circuit 2520 that includes a clock generator 2522, pattern memory 2524 and rising edge detector 2526. The clock generator 2522 includes a phase locked loop (PLL) that is locked to a sense signal from the scanner 2518. The PLL generates a high frequency clock signal at about 80 MHz that is locked to the sense signal. The high frequency clock signal clocks data sequentially from addresses in the pattern memory 2524.

The rising edge detector 2526 outputs a pulse in response to each transition 0-to-1 transition of the data retrieved from the pattern memory 2524. The pulses then form the clock signal that drives the buffer output, gamma correction memory 2510, and D/A converter 2512.

Figure 26:
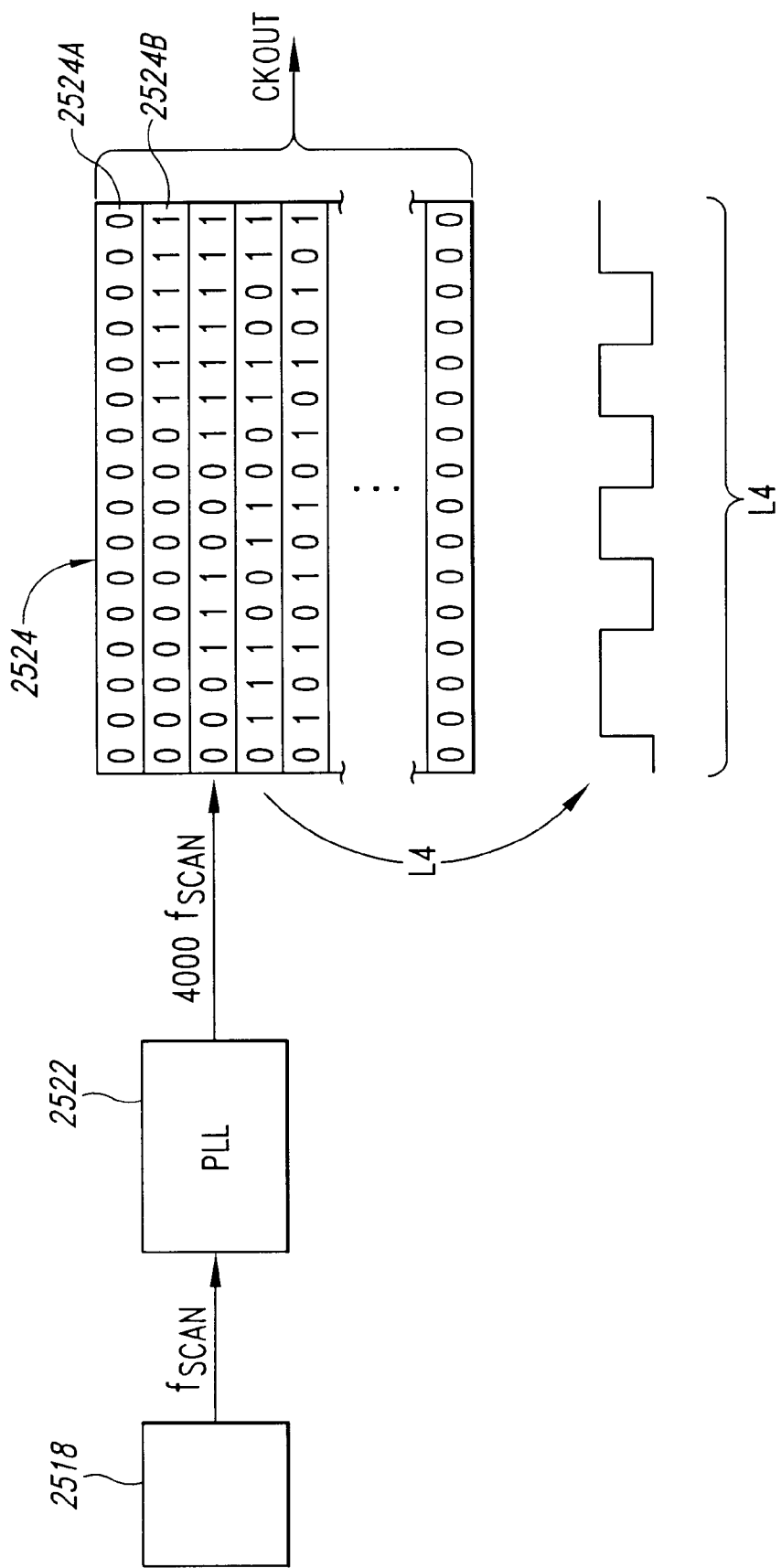
FIG. 26 is a detail block diagram of a clock generation portion of the block diagram of FIG. 25.

One skilled in the art will recognize that the timing of pulses output from the edge detector 2526 will depend upon the data stored in the pattern memory 2524 and upon the scanning frequency $f_{SCAN}$ of the scanner 2518. FIG. 26 shows a simplified example of the concept. One skilled in the art will recognize that, in FIG. 26, the data structure is simplified and addressing and other circuitry have also been omitted for clarity of presentation.

In the example, if the scanning frequency $f_{SCAN}$ is 20 kHz and clock generator 2522 outputs a clock signal at 4000 times the scanning frequency $f_{SCAN}$, the pattern memory 2524 is clocked at 80 MHz. If all bits in an addressed memory location 2524A are 0, no transitions of the output clock occur for 16 transitions of the generator clock. For the data structure of location 2524B, a single transition of the output clock occurs for 16 transitions of the generator clock. The number and relative timing of the pulses is thus controlled by the data stored in the pattern memory 2524. The frequency of the generator clock on the other hand depends upon the scanner frequency. As the scanner frequency varies, the timing of he pulses thus will vary.

The approach of FIG. 25 is not limited to sinusoidal rate variation correction. The clock pattern memory 2524 can be programmed to address many other kinds of nonlinear effects, such as optical distortion, secondary harmonics, and response time idiosyncrasies of the electronics or optical source.

Figure 27:
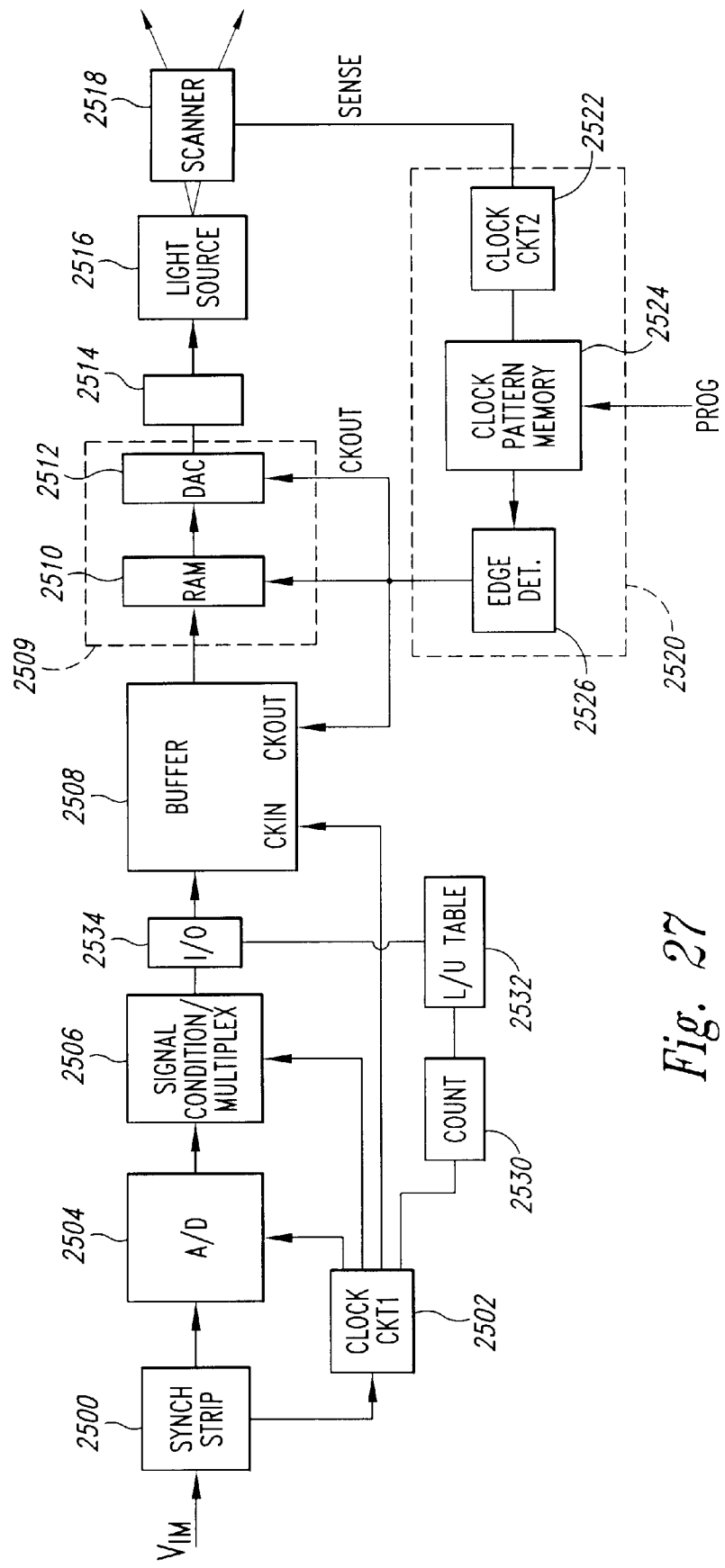
FIG. 27 is a block diagram of an alternative embodiment of the apparatus of FIG. 25 including pre-distortion.

Moreover, the basic structure of FIG. 25 can be modified easily, by inserting a bit counter 2530, look up table 2532, and vertical incrementing circuit 2534 and as shown in FIG. 27. The counter 2530 addresses the look up table in response to each pulse of the input clock to retrieve two bits of stored data. The retrieved data indicate whether the vertical address should be incremented, decremented or left unaffected. If the address is to be incremented or decremented, the incrementing circuit increments or decrements the address in the buffer 2508, so that data that were to be stored in a nominal memory location are actually stored in an alternate location that is one row higher or lower than the nominial location.

A graphical representation of one such data structure is shown in the simplified example FIG. 28. In this example, the first three sets of data bits for the first line of data (line 0) are stored in the first memory row, the next three sets of data bits for the first line are stored in the second memory row, and the last three sets of data bits for the first line are stored in the third memory row. One skilled in the art will recognize that this example has been greatly simplified for clarity of presentation. An actual implementation would include many more sets of data.

The result is that some portion of the data for one line is moved to a new line. The resulting data map in the buffer 2508 is thus distorted as can be seen from FIG. 28. However, distortion of the data map can be selected to offset vertical distortion of the image caused by scanning and optical distortion. The result is that the overall system distortion is reduced.

Although the invention has been described herein by way of exemplary embodiments, variations in the structures and methods described herein may be made without departing from the spirit and scope of the invention. For example, the positioning of the various components may also be varied. In one example of repositioning, the correction scanner can be positioned in the optical path either before or after the other scanners. Also, the exit pupil expander may be omitted in many applications. In such embodiments, conventional eye tracking may be added to ease coupling of the scanned beam to the eye. Moreover, the scanning system can be used for projection displays, optical storage and a variety of other scanned light beam applications. Further, a variety of other timing control mechanisms, such as programmable delays, may be used to compensate for the variable speed of the scanner in place of the approaches described with reference to FIGS. 22–28. In another alternative approach to timing and distortion correction, the memory map may be undistorted and addressed at a constant rate. In such an approach, the data are output from the buffer 2508 at a constant rate. To compensate for nonlinearity of the scanner, the data for each location are derived from the retrieved image data and output at a fixed increments. Referring to FIG. 24, for example, data would be output at time 1500, even though this time did not correspond directly to a pixel time. To compensate, the buffer 2508 is addressed at the 10th and 11th locations for this line. Then, the output data is a weighted average of the data from the 10th and 11th locations. Thus, the buffer 2508 is clocked at a constant rate and pixels are output at a constant rate. Yet, by controlig the addressing circuitry carefully and performing a weighted averaging, the output data is sinusoidally corrected. Accordingly, the invention is not limited except as by the appended claims.

What is claimed is:

1. A method of producing an image for viewing, comprising the steps of:

emitting light from a first location;

resonantly scanning the light along a first axis at a first frequency;

scanning the light along a second axis different from the first axis at a second frequency, while scanning the light along the first axis;

scanning the light along the second axis at a third frequency that is an integral multiple of the first frequency, while scanning the light along the first axis; and modulating the light in a pattern corresponding to the image, synchronously with the step of resonantly scanning the light along the second axis.

2. The method of claim 1 wherein the step of scanning the light along the second axis at a third frequency includes resonantly scanning at the third frequency.

3. The method of claim 1 wherein the step of scanning the light along the second axis at a third frequency includes the steps of:

scanning a turning mirror with a piezoelectric scanner at the third frequency; and redirecting the light with the scanned turning mirror.

4. The method of claim 1 wherein the step of scanning the light along the second axis at a third frequency that is an integral multiple of the first frequency, while scanning the light along the first axis includes the steps of:

sensing a scanning position of the light along the first axis;

producing a driving signal in response to the sensed scanning position; and scanning the light along the second axis in response to the produced driving signal.

5. The method of claim 4 wherein the step of producing a driving signal in response to the sensed scanning position includes the steps of:

producing a sense signal corresponding to the sensed scanning position; and frequency doubling the sense signal.

6. A method of scanning a light beam in a substantially raster pattern, comprising the steps of:

emitting, from a first position, the light beam;

scanning the light beam about a first axis through a first angular range at a first rate with a first period;

scanning the light beam about a second axis orthogonal to the first axis through a second angular range at a second rate;

directing the emitted, scanned light toward the user's eye; and scanning the light beam at a third rate at least as high as the first rate about the second axis at an amplitude selected to offset motion of the second scan during the first period.

7. The method of claim 6 wherein the third rate is twice the first rate.

8. The method of claim 6 wherein the steps of scanning the light beam about a first axis through a first angular range at a first rate with a first period and scanning the light beam about a second axis orthogonal to the first axis through a second angular range at a second rate, include sweeping a mirror about both the first and second axes.

9. The method of claim 6 wherein the step of scanning the light beam at a third rate at least as high as the first rate along the second axis at an amplitude selected to offset motion of the second scan during the first period includes the steps of:

determining the position of the beam about the first axis;

producing an electrical signal indicative of the determined position;

generating a drive signal in response to the electrical signal; and driving a scanner with the drive signal to scan the light at the third rate.

10. The method of claim 9 wherein the step of generating a driving signal includes the step of frequency doubling the electrical signal indicative of the position of the beam about the first axis.

11. A method of scanning an optical path through a substantially rectilinear pattern, comprising the steps of:

scanning a first mirror periodically in a first direction at a first frequency, the first mirror being positioned to sweep the optical path about a first axis;

scanning a second mirror continuously in a second direction while scanning the first mirror in the first direction, the second mirror being positioned to sweep the optical path about a second axis different from the first axis;

producing a scanning signal at a second frequency that is twice the first frequency of the first frequency; and scanning a third mirror in response to the scanning signal, the third mirror being positioned to sweep the optical path about the second axis.

12. The method of claim 11 wherein the first and second mirrors are the same mirror.

13. The method of claim 11 wherein the first and second mirrors are different mirrors.

14. The method of claim 11 wherein the step of scanning a first mirror periodically in a first direction at a first frequency, includes activating a resonant scanner.

15. The method of claim 11 wherein the step of scanning a third mirror in response to the scanning signal, includes activating a resonant correction scanner having a resonant frequency at the frequency of the scanning signal.

16. The method of claim 15 further including varying the resonant frequency of the resonant correction scanner.

17. A method of scanning an optical path through a periodic pattern with a scanning system including a mechanically resonant scanner having a resonant frequency, comprising the steps of:

scanning the optical path through a field of view at the resonant frequency along a first axis by activating the mechanically resonant scanner;

scanning, at a frequency lower than the resonant frequency, the optical path along a second axis different from the first axis while performing the step of scanning the optical path along the first axis by activating the mechanically resonant scanner;

determining an the amount of scan of the optical path along the second axis that occurs while the optical path scans once through the field of view;

producing a driving signal at a correction frequency that is an integral multiple of the resonant frequency; and scanning along the second axis at the correction frequency and with an amplitude selected to offset the determined amount of scan.

18. The method of claim 17 wherein the step of scanning along the second axis at the correction frequency and with an amplitude selected to offset the determined amount of scan, includes activating a resonant correction scanner having a resonant frequency at the correction frequency.

19. The method of claim 15 further including varying the resonant frequency of the correction scanner.

20. A scanner for scanning a beam of electromagnetic energy through a substantially raster pattern, comprising:

a first scanning assembly having a first mirror configured to pivot about a first axis and a second mirror configured to pivot about a second axis orthogonal to the first axis;

a second scanning assembly having a third mirror separate from the first mirror and the second mirror, the third mirror being pivotable about the first axis in response to a driving signal;

a position sensor having a sensing input coupled to the first mirror and a sensing output, the position sensor being responsive to movement of the first mirror about the first axis to produce an electrical signal at the sensing output corresponding to the position of the first mirror; and a driving circuit having a signal input coupled to the sensing output and a driving output coupled to the second scanning assembly, the driving circuit being responsive to the electrical signal to produce the driving signal.

21. The scanner of claim 20 wherein the first and second mirrors are the same mirror.

22. The scanner of claim 20 wherein the first scanning assembly is a resonant assembly having a first resonant frequency.

23. The scanner of claim 22 wherein the third scanning assembly is a resonant assembly having a third resonant frequency.

24. The scanner of claim 23 wherein the third resonant frequency is twice the first resonant frequency.

25. The scanner of claim 24 wherein the first scanning assembly includes a first MEMs scanner.

26. The scanner of claim 25 wherein the third scanning assembly includes a third MEMs scanner.

27. The scanner of claim 25 wherein the first MEMs scanner is biaxial.

28. A scanning apparatus for scanning a beam in a substantially raster format, comprising:

a first scanning assembly having a first optical input and a first scan signal input, the first scanning assembly being configured to scan an optical beam substantially sinusoidally at a first frequency about a first axis and to scan the optical beam about a second axis orthogonal to the first axis; and a corrective scanner positioned to receive the optical beam either before or after the first scanning assembly and configured to scan the beam about the second axis at a second frequency that is twice the first frequency.

29. The scanning apparatus of claim 28 wherein the corrective scanner has an angular range equal to an expected angle of travel of the first scanning assembly about the second axis during a single scan of the first scanning assembly about the first axis.

30. The scanning apparatus of claim 29 wherein the first scanning assembly includes a first reflective surface that pivots through a first angular range about the first axis.

31. The scanning apparatus of claim 30 wherein the first reflective surface pivots through a second angular range about the second axis.

32. The scanning apparatus of claim 30 wherein the first scanning assembly includes a second reflective surface that pivots through a second angular range about the second axis.

33. The scanning apparatus of claim 29 wherein the first scanning assembly has a resonant mode at the first frequency.

34. The scanning apparatus of claim 29 wherein the correction scanner has a resonant mode at twice the first frequency.

35. The scanning apparatus of claim 30 wherein the first scanning assembly is a MEMs scanner.

36. The scanning apparatus of claim 35 wherein the MEMs scanner is a biaxial scanner.

37. The scanning apparatus of claim 36 wherein the MEMs scanner is a resonant scanner.

38. The scanning apparatus of claim 30 wherein the first scanning assembly includes a sensor responsive to provide a sense signal indicative of the angle of the optical beam about the first axis.

39. The scanning apparatus of claim 30 further including drive circuitry having an input coupled to the sensor and an output coupled to the correction scanner, the drive circuitry being responsive to the sense signal to produce an drive signal.

40. The scanning apparatus of claim 39 wherein the drive circuitry includes a frequency doubling circuit.

41. An imager for acquiring data corresponding to a target object, comprising:

a first scanning assembly having a first optical input and a first scan signal input, the first scanning assembly being configured to scan substantially at a first frequency about a first axis and to scan about a second axis different from the first axis;

imaging optics aligned to the first scanning assembly and configured to collect light from the target object direct the gathered light along an optical path including the first scanning assembly; and a correction scanner positioned along the optical path and configured to redirect the gathered light along the second axis at a frequency and amplitude corresponding to an expected amount of scan of the first scanning assembly about the second axis during a half period of the first frequency.

42. The imager of claim 41 wherein the first scanning assembly includes a biaxial scanner.

43. The imager of claim 42 wherein the correction scanner scanner is a MEMs scanner.

44. The imager of claim 42 wherein the biaxial scanner is a MEMs scanner.

45. The imager of claim 41 wherein the first scanning assembly includes a pair of uniaxial scanners.

46. The imager of claim 45 wherein the correction scanner scanner is a MEMs scanner.

47. The imager of claim 41 for use in reading symbols, further comprising:

a photodetector oriented to detect the light redirected by the correction scanner, the photodetetor being of a type that produces an electrical signal indicative of the intensity of detected light;

control electronics coupled to the photodetector and responsive to the electrical signal to identify information represented by the symbol.

\* \* \* \* \*